(12) United States Patent
Akita et al.

(10) Patent No.: US 8,913,544 B2
(45) Date of Patent: Dec. 16, 2014

(54) COMMUNICATION CONTROL SYSTEM WITH AD HOC WIRELESS COMMUNICATION FUNCTION

(75) Inventors: Hidenori Akita, Chiryu (JP); Toshiya Saito, Hekinan (JP)

(73) Assignee: DENSO CORPORATION, Kariya (JP)

( * ) Notice: Subject to any disclaimer, the term of this patent is extended or adjusted under 35 U.S.C. 154(b) by 226 days.

(21) Appl. No.: 13/569,272

(22) Filed: Aug. 8, 2012

(65) Prior Publication Data

US 2013/0039357 A1 Feb. 14, 2013

(30) Foreign Application Priority Data

Aug. 10, 2011 (JP) .................................. 2011-175023

(51) Int. Cl.
*H04W 4/02* (2009.01)
*H04W 4/04* (2009.01)
*H04W 24/02* (2009.01)
*H04W 84/00* (2009.01)
*H04W 84/18* (2009.01)
*H04W 76/04* (2009.01)
*H04W 84/20* (2009.01)

(52) U.S. Cl.
CPC ............. *H04W 4/046* (2013.01); *H04W 24/02* (2013.01); *H04W 84/005* (2013.01); *H04W 84/18* (2013.01); *H04W 76/043* (2013.01); *H04W 84/20* (2013.01)
USPC ........................... 370/315; 370/338; 370/351

(58) Field of Classification Search
USPC ......................................... 370/315, 338, 351
See application file for complete search history.

(56) References Cited

U.S. PATENT DOCUMENTS

| 6,868,333 | B2 * | 3/2005 | Melen ........................... 701/482 |
|---|---|---|---|
| 2004/0230345 | A1 * | 11/2004 | Tzamaloukas ..................... 701/1 |
| 2005/0197771 | A1 * | 9/2005 | Seick et al. .................... 701/301 |
| 2010/0041388 | A1 * | 2/2010 | Kawasaki .................. 455/422.1 |

FOREIGN PATENT DOCUMENTS

| JP | 2000-504859 A | 4/2000 |
|---|---|---|
| JP | 2002-198886 A | 7/2002 |
| JP | B2-3583988 | 11/2004 |
| JP | 2007-249473 A | 9/2007 |
| JP | 2007-310733 A | 11/2007 |
| JP | A-2008-027011 | 2/2008 |
| JP | 2009-059092 A | 3/2009 |
| JP | 2009-140292 A | 6/2009 |
| JP | 2010-117837 A | 5/2010 |
| JP | 2010-140135 A | 6/2010 |
| WO | 2004-102346 A2 | 11/2004 |

* cited by examiner

*Primary Examiner* — Dang Ton
*Assistant Examiner* — Robert M Morlan
(74) *Attorney, Agent, or Firm* — Posz Law Group, PLC

(57) ABSTRACT

In a communication control apparatus wirelessly communicable with a plurality of wireless communication units respectively installed in a plurality of vehicles, a first determiner determines at least one wireless communication unit in a number of wireless communication units in the plurality of wireless communication units as a first enabling unit that enables wireless communications with the communication control apparatus if information transmitted from the at least one wireless communication unit is second type information including a piece of vehicle information that includes at least the identifier of the corresponding vehicle. A second determiner determines a wireless communication unit in the remaining one or more wireless communication units as a second enabling unit, which enables wireless communications with the communication control apparatus, if information transmitted from the wireless communication unit is not included in the information transmitted from the first enabling unit.

20 Claims, 12 Drawing Sheets

COMMUNICATION CONTROL SYSTEM WITH AD HOC WIRELESS COMMUNICATION FUNCTION

CROSS REFERENCE TO RELATED APPLICATIONS

This application is based on and claims the benefit of priority from Japanese Patent Application 2011-175023 filed on Aug. 10, 2011, the disclosure of which is incorporated in its entirety by reference.

TECHNICAL FIELD

The present disclosure relates to techniques for controlling wireless communications among wireless communication units each equipped with at least one of a centralized wireless communication function and an ad hoc wireless communication function.

BACKGROUND

Inter-vehicle communication techniques have been being developed for improvement of safety and/or convenience of their vehicles. For example, Japanese Patent Application Publication No. 2008-27011 discloses an example of these inter-vehicle communication techniques.

The known inter-vehicle communication technique uses an information collection center communicable with a plurality of vehicles that are running in a preset communicable region within which inter-vehicle wireless communications can be carried out.

Specifically, the known inter-vehicle communication technique is designed to establish a group in a plurality of vehicles that are running within the communicable region, and determine one of the plurality of vehicles in the communicable region as a host vehicle. After the determination, the host vehicle performs inter-vehicle communications with the other vehicles in the communicable region to collect information from the other vehicles. Then, the host vehicle uploads, to the information collection center, the collected information and information about the host vehicle.

The known inter-vehicle communication technique results in a reduction in the amount of communications traffic required to send information about each of a plurality of vehicles in the communicable region in comparison to that required if each of the plurality of vehicles individually sends, to the information collection center, the same information thereabout.

SUMMARY

However, the known inter-vehicle communication technique may have at least one problem described hereinafter. Specifically, let us assume that a target vehicle, which cannot communicate with other vehicles in a group if all the vehicles are running within a communicable region, is running in the communicable region. In this assumption, the information collection center may not collect information about the target vehicle although the target vehicle is running in the communicable region. That is, the information collection center may not sufficiently collect information from a plurality of vehicles that are running in a predetermined information-gathering target region.

In view of the circumstances set forth above, one aspect of the present disclosure seeks to provide communication control apparatuses designed to address the problem set forth above.

Specifically, an alternative aspect of the present disclosure aims to provide such communication control apparatuses capable of sufficiently collecting information about a plurality of vehicles even if at least one of the plurality of vehicles cannot communicate with the other vehicles. Particularly, a further aspect of the present disclosure aims to provide such communication control apparatuses, which achieve sufficient information collection without an increase in total communications traffic.

According to a first exemplary aspect of the present disclosure, there is provided a communication control apparatus wirelessly communicable with a plurality of wireless communication units respectively installed in a plurality of vehicles. The plurality of wireless communication units includes at least one first type wireless communication unit having a centralized communication function and an ad hoc wireless communication function, and at least one second type wireless communication unit having the centralized communication function without the ad hoc wireless communication function. The communication control apparatus includes a receiver that receives information transmitted from a number of wireless communication units of a number of vehicles based on their centralized communication, functions in the plurality of wireless communication units. The information transmitted from a vehicle in the number of vehicles is one of first-type information and second-type information. The first-type information includes a piece of vehicle information including at least an identifier of the vehicle itself and a piece of vehicle information including an identifier of at least one other vehicle obtained based on the ad hoc wireless communication function of the vehicle. The second-type information includes a piece of vehicle information including at least the identifier of the vehicle itself. The communication control apparatus includes a first determiner that determines at least one wireless communication unit in the number of wireless communication units as a first enabling unit, which enables wireless communications with the communication control apparatus, if the information transmitted from the at least one wireless communication unit is the second type information. The communication control apparatus includes a second determiner that determines a wireless communication unit in the remaining one or more wireless communication units in the number of wireless communication units as a second enabling unit, which enables wireless communications with the communication control apparatus, if the information transmitted from the wireless communication unit is not included in the information transmitted from the first enabling unit.

As described above, the communication control apparatus according to the first exemplary aspect of the present disclosure is capable of collecting: vehicle information about a vehicle in which the at least one first type wireless communication unit is installed; vehicle information about a vehicle in which the at least one second type wireless communication unit is installed; and vehicle information about a vehicle in which a wireless communication unit, referred to as a third type wireless communication unit, wirelessly communicable with the at least one first type wireless communication unit, is installed.

Specifically, the communication control apparatus according to the first exemplary aspect of the present disclosure is designed to collect vehicle information about:

vehicles capable of performing ad hoc wireless communications with other vehicles equipped with the first type wireless communication unit; and vehicles equipped with the second type wireless communication unit, which cannot perform ad hoc wireless communications with the wireless communication units of other vehicles, so that they cannot establish a group with respect to the other vehicles.

This reduces the amount of missing vehicle information during collection of vehicle information of vehicles running within a centralized communication region within which the running vehicle are able to communicate with the communication control apparatus based on their centralized communication functions.

From a different view of the first exemplary aspect of the present disclosure, the communication control apparatus permits wireless communications to be performed only to the first and second enabling units, thus disabling any wireless communication unit other than the first and second enabling units from, wirelessly communicating with therewith. This maintains low total wireless communications traffic in comparison to that required if each wireless communication unit individually communicates with the communication control apparatus.

In an embodiment of the communication control apparatus according to the first exemplary aspect of the present disclosure, the communication control apparatus has a predetermined first communicable region according to a centralized communication function thereof, each of the plurality of wireless communication units being communicable with the communication control apparatus if a corresponding vehicle is located within the first communicable region. The communication control apparatus further includes a non-overlap region extractor that: estimates, for each of the first enabling unit and the second enabling unit, a second communicable region within which ad hoc wireless communications are allowed based on the corresponding ad hoc wireless communication function; and extracts at least one non-communicable region within the first communicable region, the at least one non-communicable region being external to the second communicable region for each of the first enabling unit and the second enabling unit. The communication control apparatus includes a calculator that calculates, for each of the remaining one or more wireless communication units in the number of wireless communication units, a third communicable region within which ad hoc wireless communications are allowed based on the corresponding ad hoc wireless communication function. The communication control apparatus includes a third determiner that determines a wireless communication unit in the remaining one or more wireless communication units as a third enabling unit that enables wireless communications with the communication control apparatus if third communicable region of the wireless communication unit has an overlap with the extracted at least one non-communicable region.

In this embodiment, even if at least one of the first and second enabling units cannot communicate with wireless communication units due to variations of the second communicable region of the at least one of the first and second enabling units, the non-overlap region extractor extracts at least one non-communicable region within the first communicable region. The at least one non-communicable region is external to the second communicable region for each of the first enabling unit and the second enabling unit. In addition, the calculator calculates, for each of the remaining one or more wireless communication units in the number of wireless communication units, a third communicable region within which ad hoc wireless communications are allowed based on the corresponding ad hoc wireless communication function. The third determiner determines a wireless communication unit in the remaining one or more wireless communication units as a third enabling unit that enables wireless communications with the communication control apparatus if the third communicable region of the wireless communication unit has an overlap with the extracted at least one non-communicable region.

This ensures vehicle information to be collected even though variations occur in the second communicable region after determination of the first and second enabling units.

In a modification of the embodiment of the communication control apparatus according to the first exemplary aspect of the present disclosure, the non-overlap region extractor is configured to:

when communication disabling information indicative of disabling of communications of one of the first and second enabling units is transmitted from the corresponding one of the first and second enabling units, estimate, for the other of the first and second enabling units, a fourth communicable region within which ad hoc wireless communications are allowed based on the corresponding ad hoc wireless communication function; and extract the at least one non-communicable region such that the at least one non-communicable region is external to the fourth communicable region for the other of the first and second enabling units.

In this modification, even if an ad hoc wireless communicable region of one of the first and second enabling units due to disabling of communications of the corresponding one of the first and second enabling units with the communication control apparatus is transmitted, it is possible to extract the at least one non-communicable region such that the at least one non-communicable region is external to the fourth communicable region for the other of the first and second enabling units. Thus, the third determiner determines a wireless communication unit in the remaining one or more wireless communication units as the third enabling unit that enables wireless communications with the communication control apparatus if the third communicable region of the wireless communication unit has an overlap with the extracted at least one non-communicable region.

This therefore ensures that vehicle information can be collected despite disabling of communications of one of the first and second enabling units with the communication control apparatus.

According to a second exemplary aspect of the present disclosure, there is provided a wireless communication system including: a plurality of wireless communication units respectively installed in a plurality of vehicles. The plurality of wireless communication units include at least one first type wireless communication unit having a centralized communication function and an ad hoc wireless communication function, and at least one second type wireless communication unit having the centralized communication function without the ad hoc wireless communication function; and a communication control apparatus as defined in the first exemplary aspect of the present disclosure.

The secondary exemplary aspect of the present disclosure achieves technical effects substantially the same as those of the first exemplary aspect of the present disclosure.

According to a third exemplary aspect of the present disclosure, there is provided a wireless communication system. The wireless communication system includes a plurality of wireless communication units respectively installed in a plurality of vehicles. The plurality of wireless communication units include at least one first type wireless communication unit having a centralized communication function and an ad hoc wireless communication function, and at least one second type wireless communication unit having the centralized communication function without the ad hoc wireless communication function. The wireless communication system includes a communication control apparatus as defined in the modification of the embodiment of the communication control apparatus according to the first exemplary aspect of the present disclosure. In addition, each of the plurality of wireless communication units includes a communication stop information transmitter that transmits, to the communication control apparatus, the communication stop information indicative of stop of communications of a corresponding one of the plurality of wireless communication units upon determination of stopping communications of the corresponding one of the plurality of wireless communication units using the centralized communication function.

This ensures collection of vehicle information despite any disabling of communications of at least one of the plurality of wireless communication units with the communication control apparatus.

The above and/or other features, and/or advantages of various aspects of the present disclosure will be further appreciated in view of the following description in conjunction with the accompanying drawings. Various aspects of the present disclosure can include or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
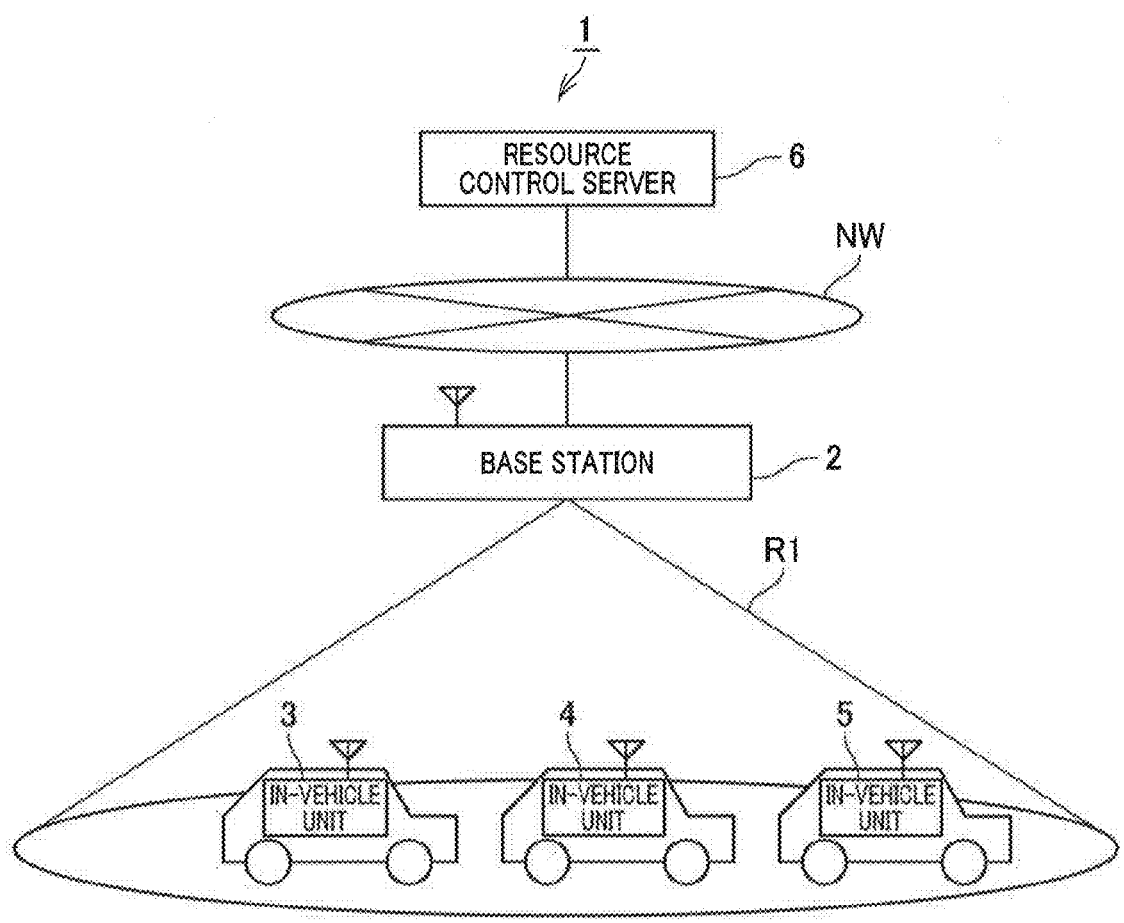
FIG. 1 is a structural view schematically illustrating an example of the overall structure of a wireless-communication system according to a first embodiment of the present disclosure.

Embodiments of the present disclosure will be described hereinafter with reference to the accompanying drawings. In these embodiments, like parts to which like reference characters are assigned are omitted or simplified to avoid redundant description.

First Embodiment

An example of the overall structure of a wireless communication system 1 according to a first embodiment of the present disclosure is illustrated in FIG. 1.

Referring to FIG. 1, the wireless communication system 1 according to this embodiment is comprised of a centralized wireless-communication base station, referred to simply as a base station 2, a number of in-vehicle wireless-communication units 3, 4, 5, . . . , and a resource control server 6.

The base station 2 is a radio communication system operative to perform centralized wireless communications, particularly cellular-network radio communications. Each of the in-vehicle wireless-communication units is installed in a vehicle and operative to perform wireless communications to the other in-vehicle wireless-communication units and/or the base station 2. The resource control server 6 is communicable with the base station 2 via, for example, a wired network NW including a router. The in-vehicle wireless-communication units will be referred to simply as in-vehicle units.

Figure 2:
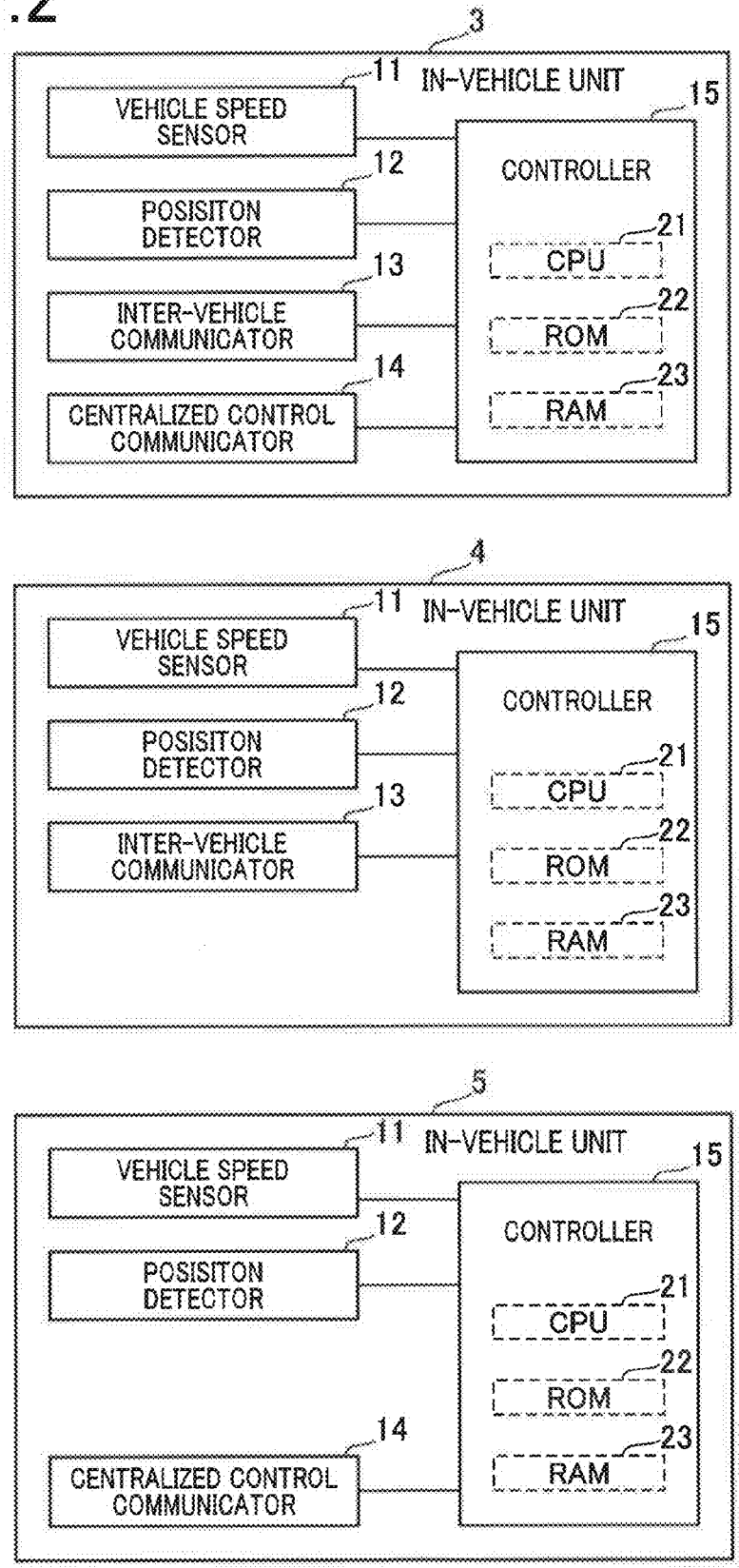
FIG. 2 is a block diagram schematically illustrating an example of the structure of each of in-vehicle wireless-communication units illustrated in FIG. 1.

Referring to FIG. 2, the in-vehicle units include three types of in-vehicle units.

The first type of in-vehicle units 3 is comprised of a vehicle speed sensor 11, a position detector 12, an inter-vehicle communicator 13, a centralized-control communicator 14, and a controller 15. That is, an in-vehicle unit 3 of the first type is capable of performing both inter-vehicle communications via the inter-vehicle communicator 13 and centralized communications via the centralized-control communicator 14.

The second type of in-vehicle units 4 is comprised of the vehicle speed sensor 11, the position detector 12, the inter-vehicle communicator 13, and the controller 15. That is, an in-vehicle unit 4 of the second type is capable of performing only inter-vehicle communications via the inter-vehicle communicator 13.

The third type of in-vehicle units 5 is comprised of the vehicle speed sensor 11, the position detector 12, the centralized-control communicator 14, and the controller 15. That is, an in-vehicle unit 5 of the third type is capable of performing only centralized communications via the centralized-control communicator 14.

The vehicle speed sensor 11 is operative to measure the speed of the vehicle, and send the measured speed to its controller 15.

The position detector 12 is made up of, for example, a plurality of sensors including a position sensor with a GPS (Global Positioning System) receiver, a distance sensor, a direction sensor, and so on. The GPS receiver is operative to receive GPS signals from GPS satellites. The position sensor is operative to detect the current position of the vehicle in which it is installed according to the received GPS signals. The distance sensor is operative to measure the rotating speed of each wheel of the vehicle, and measure the running distance of the vehicle using the measured rotating speed of each wheel. The direction sensor is operative to measure the travelling direction of the vehicle. The measurements by the sensors of the position detection, sensor 12 including the current position, the current speed, and the current travelling direction of the vehicle are inputted to the corresponding controller 15.

The inter-vehicle communicator 13 has a predetermined inter-vehicle communicable range therearound; the inter-vehicle communicable range allows the inter-vehicle communicator 13 to carry out inter-vehicle wireless communications with other vehicles located within the inter-vehicle communicable range.

The inter-vehicle communicator 13 is operative to perform ad hoc (peer to peer) wireless communications with the other inter-vehicle communicators 13 installed in other vehicles located within the inter-vehicle communicable range thereof. That is, the inter-vehicle communicator 13 operates in ad hoc mode to directly access the other inter-vehicle communicators 13 of other vehicles located within the inter-vehicle communicable range thereof without accessing a wireless access point, router, or base station.

For example, during the ad hoc wireless communications, the inter-vehicle communicator 13 of one specified vehicle transmits, to the other inter-vehicle communicators 13 of other vehicles located within the inter-vehicle communicable range thereof, vehicle information about the specified vehicle, and receives, from the other inter-vehicle communicators 13 of other vehicles located within the inter-vehicle communicable range thereof, vehicle information about the other vehicles. The vehicle information about one vehicle includes, for example, a predetermined identifier, the current position, and the current moving speed (vehicle speed) of the one vehicle. The vehicle information about one vehicle also includes the inter-vehicle communicable range if the inter-vehicle transceiver 13 is installed in the one vehicle.

The centralized-control communicator 14 is operative to perform centralized wireless communications with the resource control server 6 via the base station 2 when a corresponding vehicle is located within a predetermined centralized communicable region R1 of the base station 2.

Specifically, when a specified vehicle is located within the centralized communicable region R1 of the base station 2, the centralized-control communicator 14 of the specified vehicle transmits, to the resource server 6 via the base station 2, collected vehicle information; the collected vehicle information includes at least the vehicle information about the specified vehicle, and vehicle information about any other vehicles if the vehicle information for any other vehicles has been stored in the controller of the specified vehicle. In the first embodiment, the centralized-control communicator 14 is designed to transmit, to the resource server 6, the collected vehicle information every preset period of, for example, 10 milliseconds.

The controller 15 is designed as, for example, a normal microcomputer circuit consisting of, for example, a CPU 21, a ROM 22, a RAM 23, an IO (Input and output) interface (not shown), and so on.

The CPU 21 is designed to perform various tasks in accordance with programs stored in the ROM 22 and/or programs loaded in the RAM 23, thus controlling a corresponding at least one communicator 13, 14.

Note that FIG. 1 shows a case where an in-vehicle unit 3 of the first type, an in-vehicle unit 4 of the second type, and an in-vehicle unit 5 of the third type are located in the centralized communicable region R1. The wireless communication system 1 according to this embodiment can address a case where a plurality of in-vehicle units of each type are located in the centralized communicable region R1.

Figure 3:
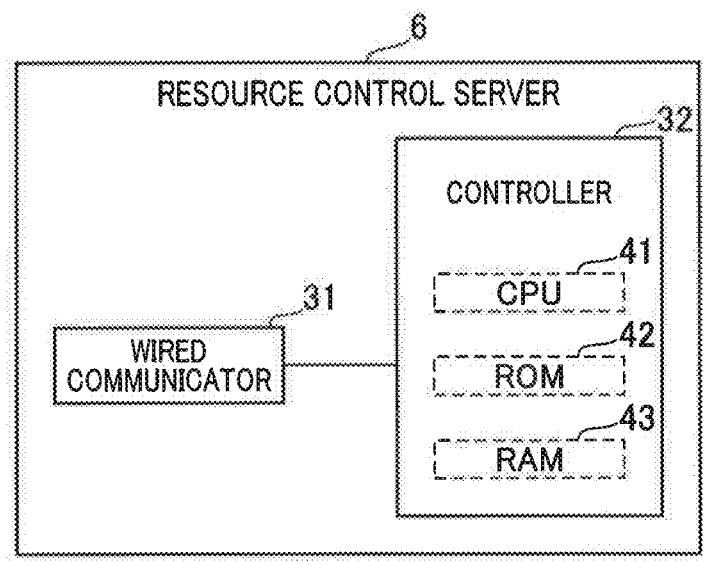
FIG. 3 is a block diagram schematically illustrating an example of the structure of a resource control server illustrated in FIG. 1.

Referring to FIG. 3, the resource control server 6 is equipped with a wired communicator 31 and a controller 32. The wired communicator 31 is operative to perform wired communications with the base station 2 via the wired network NW. The controller 32 is designed as, for example, a normal microcomputer circuit consisting of, for example, a CPU 41, a ROM 42, a RAM 43 an IO (Input and output) interface (not shown), and so on.

The CPU 41 is designed to perform various tasks in accordance with programs stored in the ROM 42 and/or programs loaded in the RAM 43, thus controlling the wired communicator 31.

In the wireless communication system 1 configured set forth above, the resource control server 6 is designed to perform a master-vehicle determining task, a master-vehicle updating task, a power-off updating task, and an enabling-instruction sending task described later. In addition, each of the in-vehicle units 3 and 5, which is equipped with the centralized-control communicator 14, is designed to perform a vehicle information sending task described later.

Figure 4:
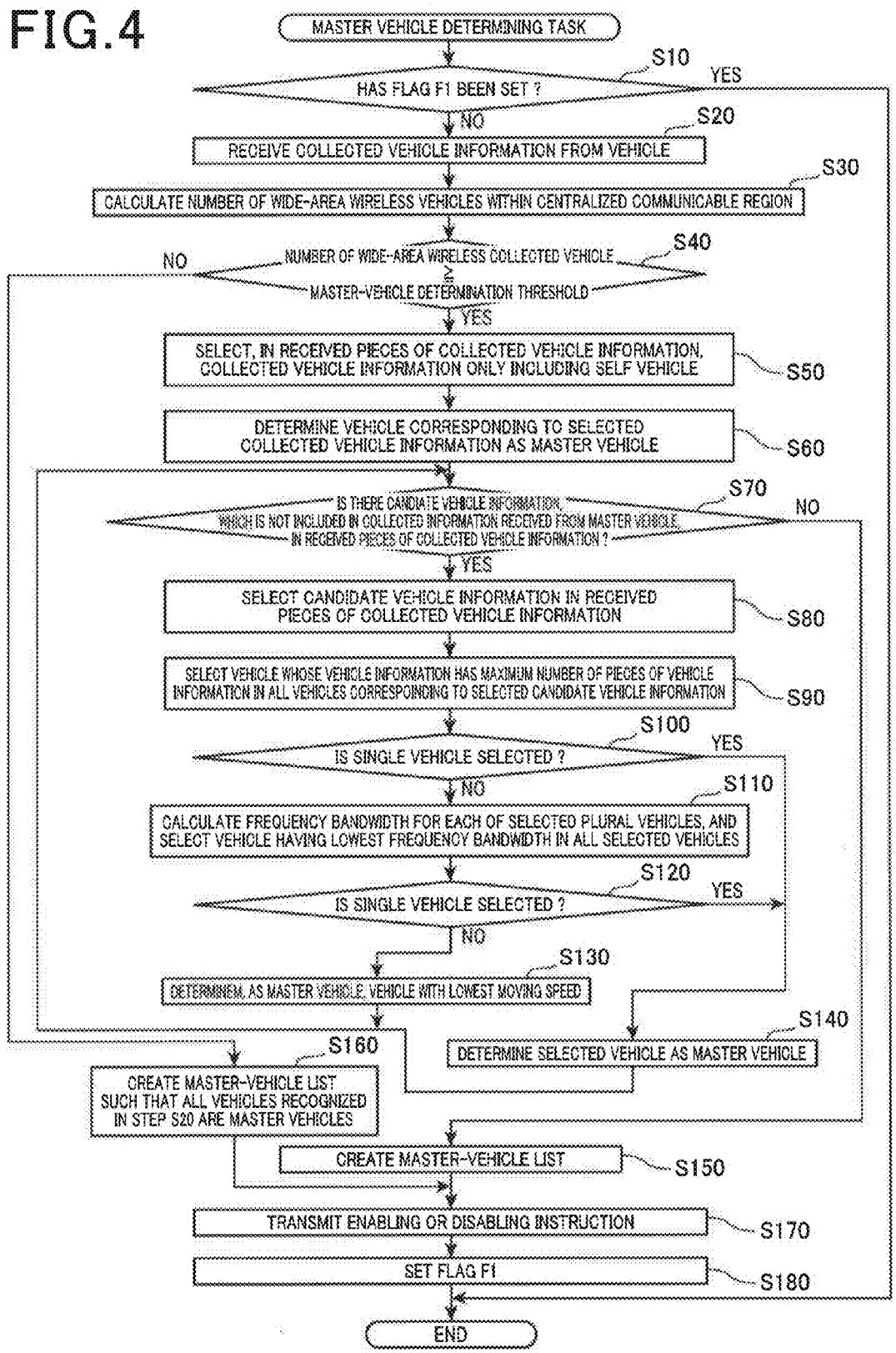
FIG. 4 is a flowchart schematically illustrating a master-vehicle determining task performed by the resource control server.

Next, specific operations of the master-vehicle determining task carried out by the CPU 41 of the resource control server 6 will be described hereinafter with reference to FIG. 4. The master-vehicle determining task is programmed to be repeatedly carried out by the CPU 41 while the resource control server 6 is powered.

When starting the master-vehicle determining task, the CPU 41 determines whether a master-determination flag F1 has been set therein or in the RAM 43 in step S10; the master-determination flag F1 is in the form of, for example, a bit set to 1. The master-determination flag F1 set in the CPU 41 or the RAM 43 represents that one or more master vehicles have been determined, and no master-determination flag F1 set in the CPU 41 or the RAM 43 represents that no master vehicles have been determined.

When determining that the master-determination flag F1 has been set (YES in step S10), the CPU 41 terminates the master-vehicle determining task. Otherwise, when determining that the master-determination flag F1 has not been established yet (NO in step S10), the CPU 41 is ready to receive collected vehicle information from the in-vehicle units 3 and 5 each equipped with the centralized-control communicator 14 and located within the centralized communicable region R1 in step S20. Note that, as described later, each of the in-vehicle units 3 and 5 is programmed to transmit, to the resource control server 6 via the base station 2, collected vehicle information until a master vehicle is determined by the resource server 6.

When collected vehicle information is transmitted from each of the in-vehicle units 3 and 5, the CPU 41 receives the collected vehicle information transmitted from each of the in-vehicle units 3 and 5 in step S20. Next, the CPU 41 recognizes vehicles each equipped with the in-vehicle unit 3 or the in-vehicle unit 5 as wide-area wireless vehicles, and calculates the number of wide-area wireless vehicles within the centralized communicable region R1 using the received vehicle information in step S30. Subsequently, the CPU 41 determines whether the number of wide-area wireless vehicles is equal to or greater than a predetermined master-vehicle determination threshold in step S40.

When determining that the number of wide-area wireless vehicles is equal to or greater than the master-vehicle determination threshold (YES in step S40), control executes step S50. In step S50, the CPU 41 selects at least one collected vehicle information in pieces of the collected vehicle information, received in step S20; the selected vehicle information includes only the vehicle information about a self vehicle.

Then, the CPU 41 determines at least one vehicle corresponding to the selected collected vehicle information as a master vehicle in step S60. That is, in step S60, the CPU 41 determines the in-vehicle unit installed in the at least one vehicle as a first enabling unit that enables wireless communications with the resource control server 6.

Note that, if the pieces of collected vehicle information received in step S20 do not include collected vehicle information about only a self vehicle, the CPU 41 terminates the master-vehicle determining task.

Following step S60, the CPU 41 determines whether there is at least one piece of vehicle information in the pieces of collected vehicle information received in step S20 in step S70; the at least one piece of vehicle information is not included in the collected vehicle information received from one or more master vehicles that have been determined during this master-vehicle determining task. The at least one piece of vehicle information, which is not included in the vehicle information received from the master vehicle in step S20, will be referred to as at least one piece of candidate vehicle information.

When there is not at least one piece of candidate vehicle information in the pieces of vehicle information received in step S20 (NO in step S70), control goes to step S150.

Otherwise, when there are pieces of candidate vehicle information in the pieces of collected vehicle information received in step S20 (YES in step S70), the CPU 41 selects one piece of candidate vehicle information in the pieces of candidate vehicle information in step S80.

Note that, when there is one piece of candidate vehicle information in the pieces of collected vehicle information received, in step S20, the CPU 41 selects a vehicle corresponding to the one piece of candidate vehicle information as a master vehicle (see step S140), returns to step S70, and performs the following operations from the operation in step S70.

In step S90, the CPU 41 selects at least one vehicle in a plurality of vehicles corresponding to the one piece of candidate vehicle information selected in step S80; the vehicle information about the selected at least one vehicle has the maximum number of pieces of vehicle information in all the vehicles corresponding to the at least one piece of candidate vehicle information selected in step S80.

Following step S90, the CPU 41 determines whether the at least one vehicle selected in step S90 is a single vehicle in step S100. When determining that the at least one vehicle selected in step S90 is a single vehicle (YES in step S100), the CPU 41 executes step S140, and determines the selected single vehicle as a master vehicle in step S140. That is, in step S140, the CPU 41 determines the in-vehicle unit installed in the selected single vehicle as a second enabling unit that enables wireless communications with the resource control server 6. Thereafter, the CPU 41 returns to step S70, and performs the following operations from the operation in step S70.

Otherwise, when determining that the at least one vehicle selected in step S90 is not a single vehicle, in other words, plural vehicles have been selected in step S90 (NO in step S100), the CPU 41 executes step S110.

In step S110, the CPU 41 calculates an available frequency bandwidth for each of the plural vehicles based on: a current level of communication quality in centralized communications between each of the plural vehicles and the resource control server 6; and an amount of collected vehicle information to be transmitted from each of the plural vehicles. The available frequency bandwidth for each of the plural vehicles is required for a corresponding one of the plural vehicles to transmit the corresponding collected vehicle information to the resource control server 6. Note that the higher the current level of communication quality in centralized communications between a vehicle and the resource control server 6 is, the greater an amount of information transmittable at a unit bandwidth from the vehicle is, resulting in a reduction of the frequency bandwidth required for the vehicle to transmit the same amount of information. In addition, the greater an amount of information to be transmitted from a vehicle to the resource control server 6 is, the longer the frequency bandwidth required for the vehicle to transmit the same amount of information is.

In step S110, after calculation of the frequency bandwidth for each of the plural vehicles, the CPU 41 selects at least one vehicle in the plural vehicles; the selected at least one vehicle in the plural vehicles has the lowest frequency bandwidth in all the plural vehicles.

Following step S110, the CPU 41 determines whether the at least one vehicle selected in step S110 is a single vehicle in step S120. When determining that the at least one vehicle selected in step S110 is a single vehicle (YES in step S120), the CPU 41 determines that the selected single vehicle is a master vehicle in step S140. That is, in step S140, the CPU 41 determines the in-vehicle unit installed in the selected single vehicle as a second enabling unit that enables wireless communications with the resource control server 6.

Thereafter, the CPU 41 returns to step S70, and performs the following operations from the operation in step S70.

Otherwise, when determining that the at least one vehicle selected in step S110 is not a single vehicle, in other words, plural vehicles are selected in step S110 (NO in step S120), control proceeds to step S130. In step S130, the CPU 41 selects one vehicle in the plural vehicles; the selected vehicle in the plural vehicles has the lowest moving speed, that is, the lowest speed thereof in all the plural vehicles. That is, in step S130, the CPU 41 determines the in-vehicle unit installed in the selected vehicle as a second enabling unit that enables wireless communications with the resource control server 6. Thereafter, control returns to step S70, and the CPU 41 performs the following operations from the operation in step S70.

As a result of repeat of the operations from the operation in step S70, if there are no pieces of candidate vehicle information in the pieces of collected vehicle information received in step S20 (NO in step S70), control goes to step S150.

In step S150, the CPU 41 creates, based on the determinations in steps S60, S130, and S140, a master-vehicle list representing whether each of the vehicles from which the corresponding collected vehicle information has been transmitted is a master vehicle, and stores therein or in the RAM 43 the master-vehicle list. Thereafter, control proceeds to step S170.

On the other hand, when determining that the number of wide-area wireless vehicles is lower than the master-vehicle determination threshold (NO in step S40), control proceeds to step S160. Then, the CPU 41 creates a master-vehicle list representing that all the vehicles, each of which has transmitted the corresponding collected vehicle information received in step S20, are master vehicles, and stores therein or in the RAM 43 the master-vehicle list in step S160. That is, in step S160, the CPU 41 determines the in-vehicle unit installed in each of the master vehicles as a fourth enabling unit that enables wireless communications with the resource control server 6.

Thereafter, control proceeds to step S170. The vehicles, each of which has transmitted the corresponding collected vehicle information received in step S20, will be referred to as "vehicle-information sent vehicles" hereinafter.

In step S170, the CPU 41 transmits, based on the master-vehicle list created in step S150 or step S160, an enabling instruction to at least one master vehicle determined in all the vehicle-information sent vehicles. The enabling instruction is configured to enable the at least one master vehicle to transmit collected vehicle information.

In step S170, if there is at least one vehicle, which has not been determined as a master vehicle, in all the vehicle-information sent vehicles, the CPU 41 defines the at least one vehicle as at least one non-master vehicle, and transmits, to the at least one non-master vehicle, a disabling instruction that disables the at least one non-master vehicle from transmitting collected vehicle information.

That is, the CPU 41 limits the target of wireless communications with the resource control server 6 to at least one master vehicle, thus disabling any non-master vehicle from wirelessly communicating with the resource control server 6.

After the operations in step S170, control proceeds to step S180.

In step S180, the CPU 41 sets the master-determination flag F1 therein or in the RAM 43 in step S180, terminating the master-vehicle determining task.

Next, specific operations of the master-vehicle updating task carried out by the CPU 41 of the resource control server 6 will be described hereinafter with reference to FIG. 5. The master-vehicle updating task is programmed to be repeatedly carried out by the CPU 41 while the resource control server 6 is powered.

When starting the master-vehicle updating task, the CPU 41 determines whether the master-determination flag F1 has been set therein or in the RAM 43 in step S210. When determining that the master-determination flag F1 has not been set yet (NO in step S210), the CPU 41 terminates the master-vehicle updating task.

Otherwise, when determining that the master-determination flag F1 has been established (YES in step S210), control proceeds to step S220. In step S220, the CPU 41 obtains, based on the current position and the inter-vehicle communicable range of the at least one master vehicle on the master-file list currently stored therein or the RAM 43, an inter-vehicle communicable region of the at least one master vehicle at the current position (see a region R11 or R12 illustrated in FIG. 9B). That is, the inter-vehicle communicable region of at least one master vehicle shows the inter-vehicle communicable range of the at least one master vehicle around the current position of the at least one master vehicle.

Following step S220, the CPU 41 determines whether there is at least one non-communicable region within the centralized communicable region R1 in step S230. The at least one non-communicable region is not contained in a part of the inter-vehicle communicable region of the at least one master vehicle; the part of the inter-vehicle communicable region is within the centralized communicable region R1.

When determining that there are no non-communicable regions within the centralized communicable region R1 (NO in step S230), the CPU 41 terminates the master-vehicle updating task. Otherwise, when determining that there is at least one non-communicable region within the centralized communicable region R1 (YES in step S230), control proceeds to step S240. In step S240, the CPU 41 extracts the at least one non-communicable region within the centralized communicable region R1.

Next, the CPU 41 extracts a plurality of non-master vehicles located close to the at least one non-communicable region using the definition in step S170, and obtains, based on the current position and the inter-vehicle communicable range of each of the plurality of non-master vehicles, an inter-vehicle communicable region of each of the plurality of non-master vehicles at the current position of a corresponding one of the plurality of non-master vehicles in step S250.

In step S260, the CPU 41 determines whether there is an overlap between the at least one non-communicable region extracted in step S240 and the inter-vehicle communicable region of each of the plurality of non-master vehicles obtained in step S250. When determining that there are no overlaps between the at least one non-communicable region extracted in step S240 and the inter-vehicle communicable region of each of the plurality of the non-master vehicles obtained in step S250 (NO in step S260), the CPU 41 terminates the master-vehicle updating task.

Otherwise, when determining that there is an overlap between the at least one non-communicable region extracted in step S240 and the inter-vehicle communicable region of at least one non-master vehicle in the plurality of non-master vehicles obtained in step S250 (YES in step S260), the CPU 41 proceeds to step S270. In step S270, the CPU 41 selects the at least one non-master vehicle in the plurality of non-master vehicles; the collected vehicle information about the selected at least one non-master vehicle has the maximum number of pieces of vehicle information in all the non-master vehicles obtained in step S250.

Following step S270, the CPU 41 determines whether the at least one non-master vehicle is a single vehicle in step S280. When determining that the at least one non-master vehicle is a single vehicle (YES in step S280), control proceeds to step S320, and determines the selected single vehicle as a master vehicle in step S320. That is, in step S320, the CPU 41 determines the in-vehicle unit installed in the selected single vehicle as a third enabling unit that enables wireless communications with the resource control server 6. Thereafter, control proceeds to step S330.

Otherwise, when determining that the at least one non-master vehicle is not a single vehicle, in other words, plural vehicles have been selected in step S270 (NO in step S280), the CPU 41 proceeds to step S290. In step S290, the CPU 41 calculates, based on: a current level of communication quality in centralized communications between each of the plural vehicles and the resource control server 6; and an amount of vehicle information to be transmitted from each of the plural vehicles, a frequency bandwidth for each of the plural vehicles. The frequency bandwidth for each of the plural vehicles is required for a corresponding one of the plural vehicles to transmit the corresponding collected vehicle information to the resource control server 6.

In step S290, after calculation of the frequency bandwidth for each of the plural vehicles, the CPU 41 selects at least one vehicle in the plural vehicles; the selected at least one vehicle in the plural vehicles has the lowest frequency band in all the plural vehicles.

Following step S290, the CPU 41 determines whether the at least one vehicle selected in step S290 is a single vehicle in step S300. When determining that the at least one vehicle selected in step S290 is a single vehicle (YES in step S290), the CPU 41 determines that the selected single vehicle as a master vehicle in step S320 set forth above, going to step S330.

Otherwise, when determining that the at least one vehicle selected in step S290 is not a single vehicle, in other words, plural vehicles have been selected in step S290 (NO in step S300), the CPU 41 proceeds to step S310. In step S310, the CPU 41 selects one vehicle in the plural vehicles; the selected vehicle in the plural vehicles has the lowest moving speed, that is, the lowest speed of the selected vehicle in all the plural vehicles. Thus, in step S310, the CPU 41 determines that the selected vehicle as a master vehicle. In addition, in step S310, the CPU 41 determines the in-vehicle unit installed in the selected single vehicle as a third enabling unit that enables wireless communications with the resource control server 6. Thereafter, the CPU 41 executes step S330.

In step S330, the CPU 41 creates, based on the determinations in steps S310 and S320, a master-vehicle list representing whether each of the vehicles from which corresponding collected vehicle information has been transmitted is a master vehicle, and stores therein or in the RAM 43 the master-vehicle list, thus updating the master-vehicle list currently stored therein or the RAM 43 so that it includes the created master-vehicle list in step S330.

Following step S330, the CPU 41 transmits, based on the master-vehicle list updated in step S330, the enabling instruction set forth above to at least one master vehicle determined in all the vehicles that have transmitted the pieces of collected vehicle information received in step S20 in step S340.

In step S340, if there is at least one vehicle, which has not been determined as at least one master vehicle, in all the vehicle-information sent vehicles, the CPU 41 defines the at least one vehicle as at least one non-master vehicle, and transmits, to the at least one non-master vehicle, the disabling instruction that disables the at least one non-master vehicle from transmitting corresponding collected vehicle information. Thereafter, the CPU 41 terminates the master-vehicle updating task.

Figure 6:
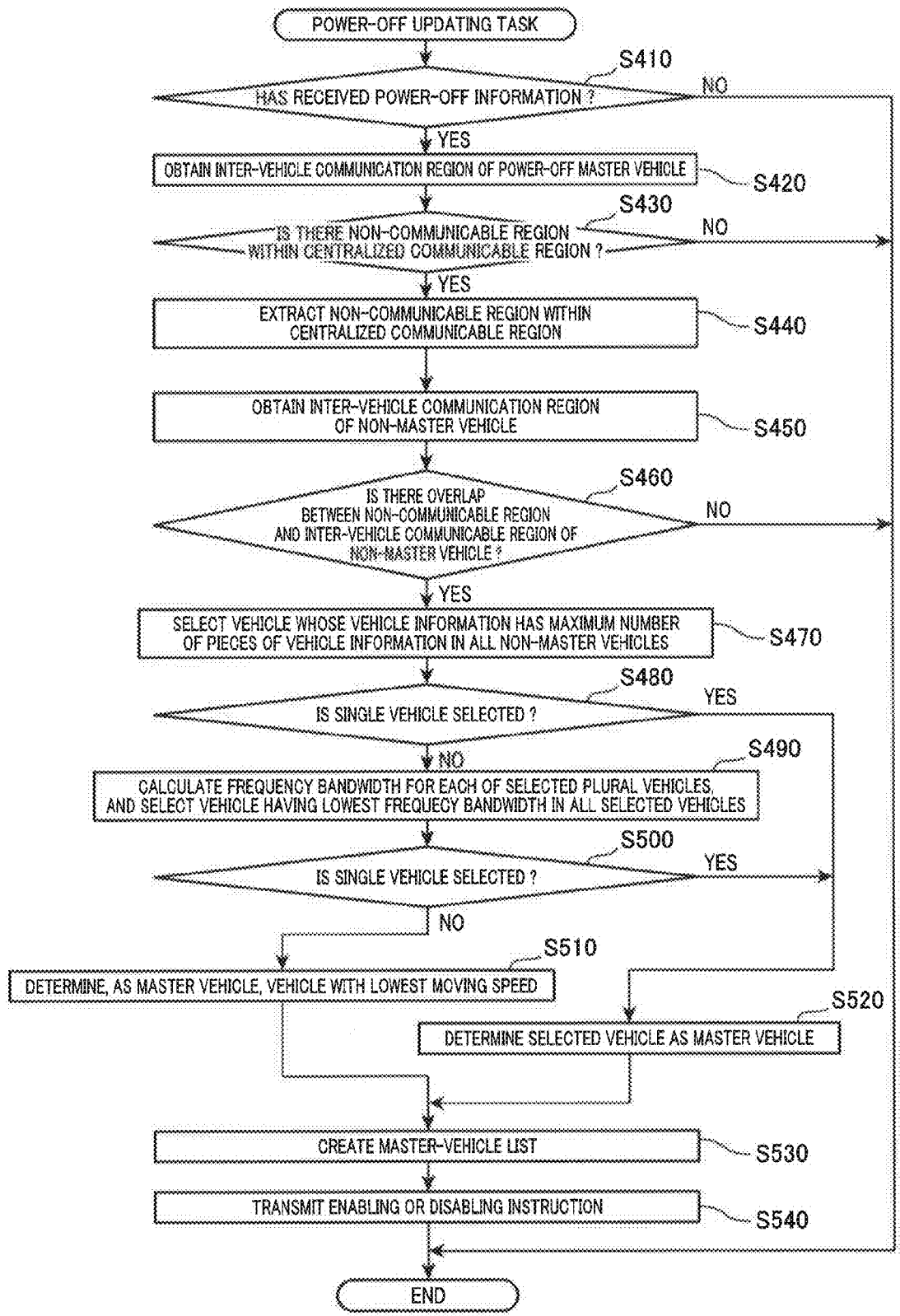
FIG. 6 is a flowchart schematically illustrating a power-off updating task performed by the resource control server.

Next, specific operations of the power-off updating task carried out by the CPU 41 of the resource control server 6 will be described hereinafter with reference to FIG. 6. The power-off updating task is programmed to be repeatedly carried out by the CPU 41 while the resource control server 6 is powered.

When starting the power-off updating task, the CPU 41 determines whether it has received power-off information from at least one master vehicle on the master-vehicle list currently stored therein or the RAM 43 in step S410. When determining that the CPU 41 has not received the power-off information from the at least one master vehicle (NO in step S410), the CPU 41 terminates the power-off updating task.

Otherwise, when determining that the CPU 41 has received the power-off information from the at least one master vehicle (YES in step S410), the CPU 41 recognizes the at least one master vehicle as at least one powered-off master vehicle, executing step S420.

In step S420, the CPU 41 obtains, based on the current position and the inter-vehicle communicable range of the at least one powered-off master vehicle, at least one inter-vehicle communicable region of the at least one powered-off master vehicle at the current position in the same manner as the operation in step S220.

Following step S420, the CPU 41 recognizes the obtained at least one inter-vehicle communicable region of the at least one powered-off master vehicle at the current position as at least one non-communicable region within which inter-vehicle wireless communications cannot be performed in step S430. Then, the CPU 41 determines whether the at least one non-communicable region is located within the centralized communicable region R1 in step S430.

When determining that the at least one non-communicable region is not located within the centralized communicable region R1 (NO in step S430), the CPU 41 terminates the power-off updating task. Otherwise, when determining that the at least one non-communicable region is located within the centralized communicable region R1 (YES in step S430), the CPU 41 executes step S440. In step S440, the CPU 41 extracts the at least one non-communicable region within the centralized communicable region R1.

Next, the CPU 41 extracts a plurality of non-master vehicles located close to the at least one non-communicable region using the definition in step S170, and obtains, based on the current position and the inter-vehicle communicable range of each of the plurality of non-master vehicles, an inter-vehicle communicable region of each of the plurality of non-master vehicles at the current position in step S450.

In step S460, the CPU 41 determines whether there is an overlap between the at least one non-communicable region extracted in step S440 and the inter-vehicle communicable region of each of the plurality of non-master vehicles obtained in step S450. When determining that there are no overlaps between the at least one non-communicable region extracted in step S440 and the inter-vehicle communicable region of each of the plurality of the non-master vehicles obtained in step S450 (NO in step S460), the CPU 41 terminates the power-off updating task.

Otherwise, when determining that there is an overlap between the at least one non-communicable region extracted in step S440 and the inter-vehicle communicable region of at least one non-master vehicle in the plurality of non-master vehicles obtained in step S450 (YES in step S460), the CPU 41 executes step S470. In step S470, the CPU 41 selects the at least one non-master vehicle in the plurality of non-master vehicles; the vehicle information about the selected at least one non-master vehicle has the maximum number of pieces of vehicle information in all the non-master vehicles obtained in step S450.

Following step S470, the CPU 41 determines whether the at least one non-master vehicle is a single vehicle in step S480. When determining that the at least one non-master vehicle is a single vehicle (YES in step S480), the CPU 41 executes step S520, and determines the selected single vehicle as a master vehicle in step S520. Thereafter, the CPU 41 executes step S530 described later.

Otherwise, when determining that the at least one non-master vehicle is not a single vehicle, in other words, plural vehicles have been selected in step S470 (NO in step S480), the CPU 41 executes step S490. In step S490, the CPU 41 calculates, based on: a current level of communication quality in centralized communications between each of the plural vehicles and the resource control server 6; and an amount of collected vehicle information to be transmitted from each of the plural vehicles, a frequency bandwidth for each of the plural vehicles. The frequency bandwidth for each of the plural vehicles is required for a corresponding one of the plural vehicles to transmit the corresponding collected vehicle information to the resource control server 6.

In step S490, after calculation of the frequency bandwidth for each of the plural vehicles, the CPU 41 selects at least one vehicle in the plural vehicles; the selected at least one vehicle in the plural vehicles has the lowest frequency band in all the plural vehicles.

Following step S490, the CPU 41 determines whether the at least one vehicle selected in step S490 is a single vehicle in step S500. When determining that the at least one vehicle selected in step S490 is a single vehicle (YES in step S490), the CPU 41 determines that the selected single vehicle as a master vehicle in step S520, going to step S530.

Otherwise, when determining that the at least one vehicle selected in step S490 is not a single vehicle, in other words, plural vehicles have been selected in step S490 (NO in step S500), the CPU 41 executes step S510. In step S510, the CPU 41 selects one vehicle in the plural vehicles; the selected vehicle in the plural vehicles has the lowest moving speed, that is, the lowest speed of the selected vehicle in all the plural vehicles. Following step S510, the CPU 41 determines that the selected vehicle as a master vehicle in step S520, going to step S530.

In step S530, the CPU 41 creates, based on the determinations in steps S510 and S520, a master-vehicle list representing whether each of the vehicles from which corresponding collected vehicle information has been transmitted is a master vehicle, and stores therein or in the RAM 43 the master-vehicle list, thus updating the master-vehicle list currently stored therein or the RAM 43 to the created master-vehicle list in the power-off updating task in step S530.

Next, in step S540, the CPU 41 transmits, based on the master-vehicle list updated in step S530, the enabling instruction set forth above to at least one master vehicle determined in all the vehicle-information sent vehicles.

In step S540, if there is at least one vehicle, which has not been determined as at least one master vehicle, in all the vehicle-information sent vehicles, the CPU 41 defines the at least one vehicle as at least one non-master vehicle, and transmits, to the at least one non-master vehicle, the disabling instruction that disables the at least one non-master vehicle from transmitting corresponding collected vehicle information. Thereafter, the CPU 41 terminates the power-off updating task.

Figure 7:
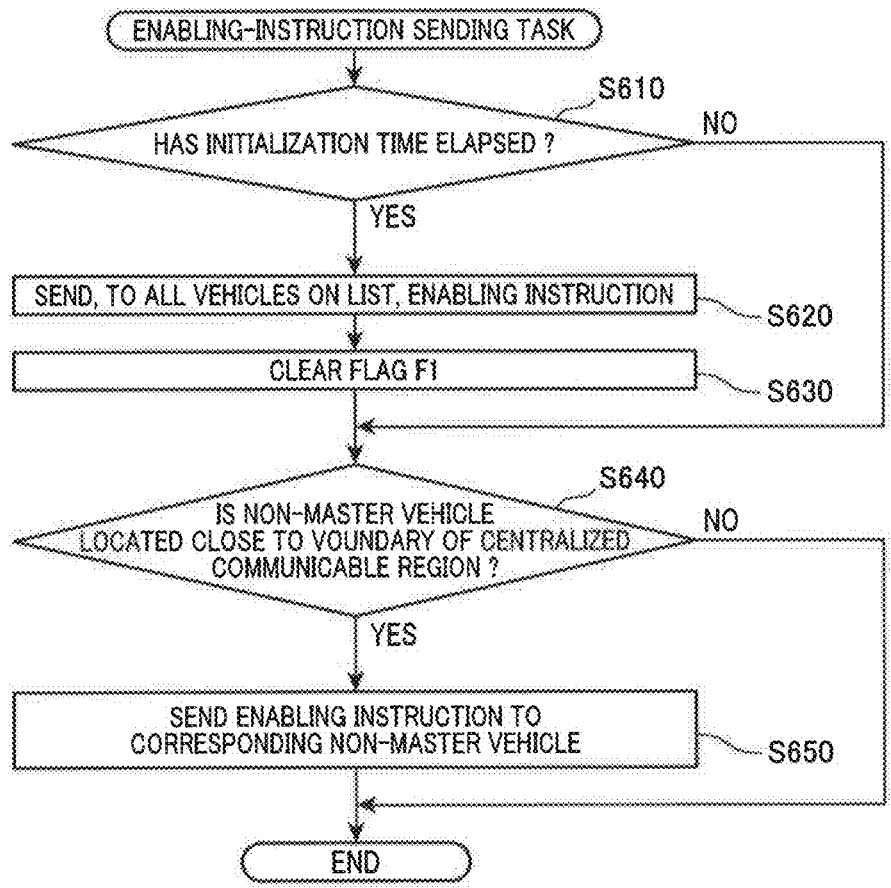
FIG. 7 is a flowchart schematically illustrating an enabling-instruction sending task performed by the resource control server.

Next, specific operations of the enabling-instruction sending task carried out by the CPU 41 of the resource control server 6 will be described hereinafter with reference to FIG. 7. The enabling-instruction sending task is programmed to be repeatedly carried out by the CPU 41 while the resource control server 6 is powered.

When starting the enabling-instruction sending task, the CPU 41 determines whether a predetermined initialization time has elapsed since the time at which the master-determination flag F1 was determined in step S610. When determining that the predetermined initialization time has not elapsed yet, which includes the case where the master-determination flag F1 has not been set yet (NO in step S610), the CPU 41 executes step S640 described later.

Otherwise, when determining that the predetermined initialization time has elapsed (YES in step S610), the CPU 41 executes step S620. In step S620, the CPU 41 sends, to all the vehicles on the master-vehicle list currently stored therein or the RAM 43, the enabling instruction, thus determining, as master vehicles, all the vehicles that have transmitted the pieces of collected vehicle information to the resource control server 6. That is, in step S620, the CPU 41 determines the in-vehicle unit installed in each of the determined master vehicles as a fifth enabling unit that enables wireless communications with the resource control server 6. Thereafter, control goes to step S630. In step S630, the CPU 41 clears the master-determination flag F1, which allows the CPU 41 to perform the master-vehicle determining task, proceeding to step S640.

In step S640, the CPU 41 determines whether at least one non-master vehicle is located close to the boundary of the centralized communicable region R1 using the current position of the at least one non-master vehicle. When determining that no non-master vehicles are located close to the boundary of the centralized communicable region R1 (NO in step S640), the CPU 41 terminates the enabling-instruction sending task. Otherwise, when determining that at least one non-master vehicle is located close to the boundary of the centralized communicable region R1 (YES in step S640), the CPU 41 sends, to the at least one non-master vehicle, the enabling instruction, thus determining, as a master vehicle, the at least one non-master vehicle in step S650. Thereafter, the CPU 41 terminates the enabling-instruction sending task.

Figure 8:
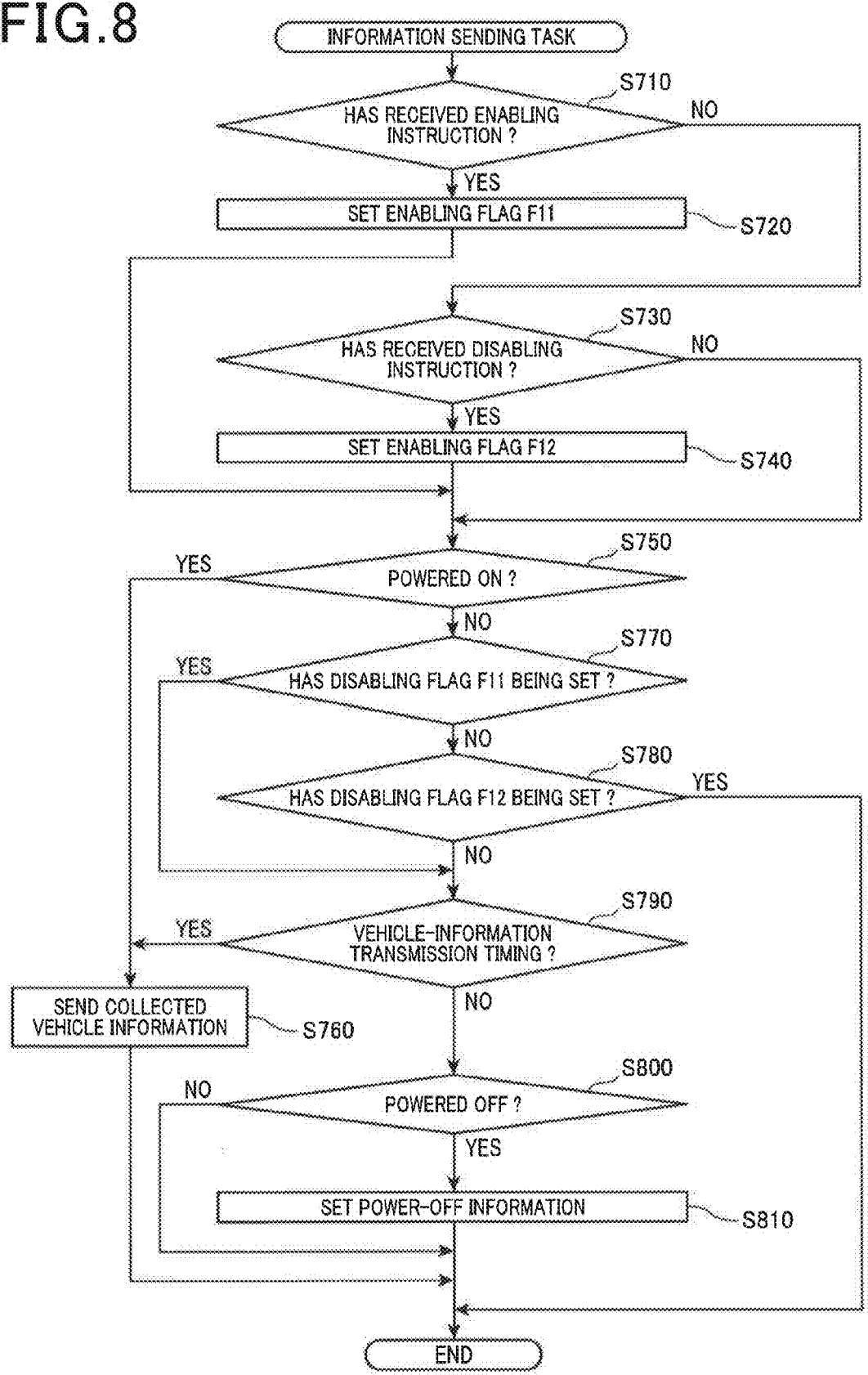
FIG. 8 is an information sending task carried out by a wireless-communication unit equipped with a centralized communication function.

Next, specific operations of an information sending task carried out by the CPU 21 of each of the in-vehicle units 3 and 5, which is equipped with the centralized-control communicator 14, will be described hereinafter with reference to FIG. 8. The information sending task is programmed to be repeatedly carried out by the CPU 21 while a corresponding in-vehicle unit 3 or 5 is powered.

When starting the information sending task, the CPU 21 determines whether it has received the enabling instruction transmitted from the resource control server 6 in step S710. When determining that it has received the enabling instruction (YES in step S710), the CPU 21 sets an enabling flag F11 therein or in the RAM 23 in step S720; the enabling flag F11 is in the form of, for example, a bit set to 1. The enabling flag F11 set in the CPU 21 or the RAM 23 represents that a corresponding in-vehicle unit 3 or 5 is enabled to send, to the resource control server 6, corresponding collected vehicle information, and no enabling flag F11 set in the CPU 21 or the RAM 23 represents that a corresponding in-vehicle unit 3 or 5 is not enabled to send, to the resource control server 6, corresponding collected vehicle information. Thereafter, the CPU 21 executes step S750.

Note that the enabling flag F11 set in the CPU 21 or the RAM 23 has been cleared when a corresponding in-vehicle unit 3 or 5 is powered.

Otherwise, when determining that it has not received the enabling instruction yet (NO in step S710), the CPU 21 executes step S730. In step S730, the CPU 21 determines whether it has received the disabling instruction transmitted from the resource control server 6 in step S730.

When determining that it has received the disabling instruction (YES in step S730), the CPU 21 sets a disabling flag F12 therein or in the RAM 23 in step S740; the disabling flag F12 is in the form of, for example, a bit set to 1. The disabling flag F12 set in the CPU 21 or the RAM 23 represents that a corresponding in-vehicle unit 3 or 5 is disabled to send, to the resource control server 6, corresponding collected vehicle information, and no disabling flag F12 set in the CPU 21 or the RAM 23 represents that a corresponding in-vehicle unit 3 or 5 is not disabled to send, to the resource control server 6, corresponding collected vehicle information. Thereafter, the CPU 21 executes step S750.

Note that the disabling flag F12 set in the CPU 21 or the RAM 23 has been cleared when the self in-vehicle unit 3 or 5 is powered.

In step S750, the CPU 21 determines whether the self in-vehicle unit 3 or 5 is powered on, in other words, the self in-vehicle unit 3 or 5 is being powered up. When determining that the self in-vehicle unit 3 or 5 is powered on (YES in step S750), the CPU 21 sends, to the resource control server 6, corresponding collected vehicle information in step S760, terminating the information sending task.

Otherwise, when determining that the self in-vehicle unit 3 or 5 is not powered on (NO in step S750), the CPU 21 executes step S770.

In step S770, the CPU 21 determines whether the enabling flag F11 has been set therein or in the RAM 23. When determining that the enabling flag F11 has been set therein or in the RAM 23 (YES in step S770), the CPU 21 shifts to step S790. Otherwise, when determining that the enabling flag F11 has not been set therein or in the RAM 23 (NO in step S770), the CPU 21 determines whether the disabling flag F12 has been set therein or in the RAM 23 in step S780.

When determining that the disabling flag F12 has been set therein or in the RAM 23 (YES in step S780), the CPU 21 terminates the information sending task. Otherwise, when determining that the disabling flag F12 has not been set therein or in the RAM 23 (NO in step S780), the CPU 21 shifts to step S790.

In step S790, the CPU 21 determines whether a vehicle-information transmission timing occurs. As described above, the centralized-control communicator 14 is designed to transmit, to the resource server 6, corresponding collected vehicle information every preset period. That is, in step S790, the CPU 21 determines whether a vehicle-information transmission timing at the next transmission cycle occurs. As described above, each of the in-vehicle units 3 and 5 is designed to transmit, to the resource server 6, the collected vehicle information every preset period of, for example, 10 milliseconds. That is, each of the in-vehicle units 3 and 5 is designed to periodically transmit, to the resource server 6, the collected vehicle information.

When determining that a vehicle-information transmission timing at the next transmission cycle occurs, in other words, the period has elapsed since the transmission of the previous collected vehicle information (YES in step S790), the CPU 21 sends, to the resource control server 6, the latest collected vehicle information in step S760, terminating the information sending task.

Otherwise, when determining that a vehicle-information transmission timing at the next cycle does not occur (NO in step S790), the CPU 21 determines whether the self in-vehicle unit 3 or 5 is powered off in step S800. Specifically, in step S800, the CPU 21 determines whether the supply of power to the self in-vehicle unit 3 or 5 from a power source installed in a corresponding vehicle is stopped.

When determining that the self in-vehicle unit 3 or 5 is powered (NO in step S800), the CPU 21 terminates the information sending task. Otherwise, when determining that the self in-vehicle unit 3 or 5 is powered off (YES in step S800), the CPU 21 sends, to the resource control server 6, power-off information in step S810, terminating the information sending task.

Figure 9A:
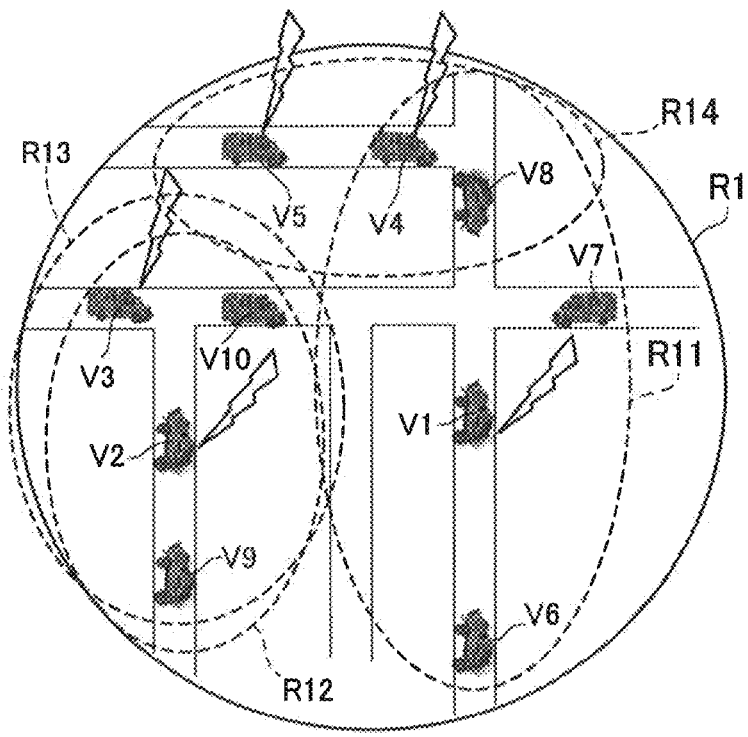
FIG. 9A is a view schematically illustrating the status of ten vehicles located within a centralized communicable region before determination of one or more master vehicles.
Figure 9B:
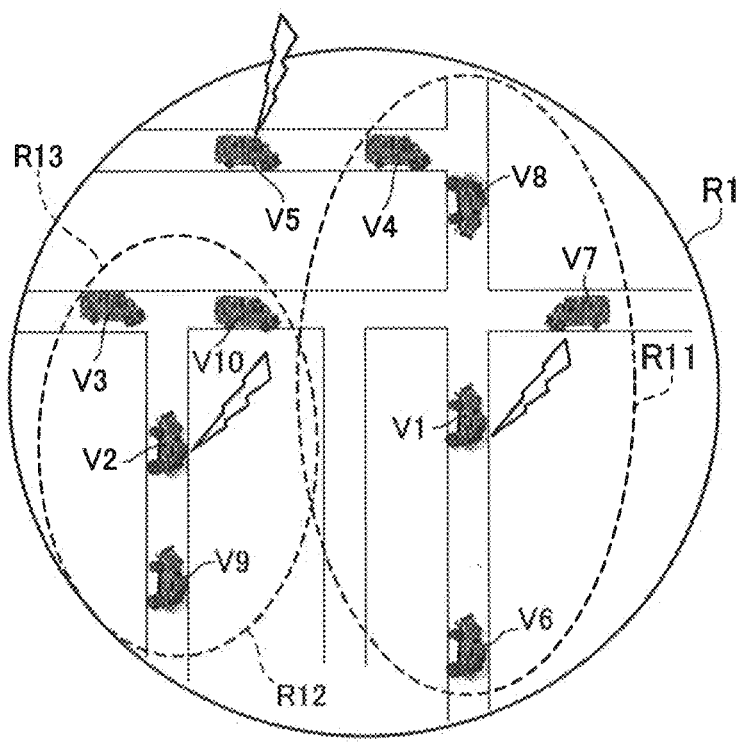
FIG. 9B is a view schematically illustrating the status of these ten vehicles located within the centralized communicable region after determination of one or more master vehicles.

Next, a specific example of how the resource control server 6 determines one or more master vehicles in the structure of the wireless communication system 1 set forth above will be described hereinafter with reference to FIGS. 9A and 9B. FIG. 9A schematically illustrates the status of ten vehicles V1 to V10 located within the centralized communicable region R1 before determination of one or more master vehicles, and FIG. 9B schematically illustrates the status of these ten vehicles V1 to V10 located within the centralized communicable region R1 after determination of one or more master vehicles.

Referring to FIG. 9A, each of the vehicles V1 to V4 incorporates therein the in-vehicle unit 3 equipped with both the inter-vehicle communicator 13 and the centralized-control communicator 14. The vehicle V5 incorporates therein the in-vehicle unit 5 equipped with the centralized-control communicator 14, and each of the vehicles V6 to V10 incorporates therein the in-vehicle unit 4 equipped with the inter-vehicle communicator 13.

In addition, the vehicles V4, V6, V7, and V8 are located within an inter-vehicle communicable region, that is, an ad hoc wireless communicable region, R11 of the vehicle V1, and the vehicles V3, V9, and V10 are located within an inter-vehicle communicable region R12 of the vehicle V2. Moreover, the vehicles V2, V9, and V10 are located within an inter-vehicle communicable region R13 of the vehicle V3, and the vehicles V5 and V8 are located within an inter-vehicle communicable region R14 of the vehicle V4.

Each of the vehicles V1 to V5 equipped with the centralized-control communicator 14 transmits corresponding collected vehicle information to the resource control server 6 (see either YES in step S750 or YES in step S790 and step S760). Note that the collected vehicle information sent from the vehicle V1 includes the vehicle information about the vehicle V1 and the vehicle information about each of the vehicles V4, V6, V7, and V8 obtained by ad hoc wireless communications between the vehicle V1 and each of the vehicles V4, V6, V7, and V8.

The collected vehicle information sent from the vehicle V2 includes the vehicle information about the vehicle V2 and the vehicle information about each of the vehicles V3, V9, and V10 obtained by ad hoc wireless communications between the vehicle V2 and each of the vehicles V3, V9, and V10. Similarly, the collected vehicle information sent from the vehicle V3 includes the vehicle information about the vehicle V3 and the vehicle information about each of the vehicles V2, V9, and V10 obtained by ad hoc wireless communications between the vehicle V3 and each of the vehicles V2, V9, and V10.

The collected vehicle information sent from the vehicle V4 includes the vehicle information about the vehicle V4 and the vehicle information about each of the vehicles V5 and V8 obtained by ad hoc wireless communications between the vehicle V4 and each of the vehicles V5 and V8. The collected vehicle information sent from the vehicle V5 includes the vehicle information about the vehicle V5.

If the master-vehicle determination threshold is set to be equal to or lower than 5, when receiving the collected vehicle information from each of the vehicles V1 to V5, the resource control server 6 determines that the number of wide-area wireless vehicles, that is five, is equal to or greater than the master-vehicle determination threshold (YES in step S40). Then, the resource control server 6 selects the vehicle V5, which has sent the collected vehicle information including only the vehicle information about the vehicle V5, as a master vehicle (see steps S50 and S60).

In addition, the resource control server 6 selects pieces of vehicle information about the vehicles V1, V2, V3, and V4 in the pieces of collected vehicle information from the vehicles V1 to V5; these pieces of vehicle information about the vehicles V1, V2, V3, and V4 are not included in the collected vehicle information sent from the master vehicle V5 (see steps S70 and S80). In other words, the resource control server 6 selects the vehicles V1, V2, V3, and V4 whose pieces of vehicle information are not included in the collected vehicle information sent from the master vehicle V5. Because the four vehicles V1, V2, V3, and V4 are selected, the resource control server 6 selects the vehicle V1 in the vehicles V1 to V4; the collected vehicle information sent from the vehicle V1 has the maximum number of pieces of vehicle information in all the vehicles V1 to V4 (see steps S80 and S90). Then, the resource control server 6 determines, as a master vehicle, the selected vehicle V1 (see step S140).

At that time, pieces of vehicle information included in at least one of the collected vehicle information sent from the master vehicle V1 and the collected vehicle information sent from the master vehicle V5 are information about the vehicles V1, V4, V5, V6, V7, and V8, and therefore, do not include information about all the vehicles V1 to V10 (see YES in step S70). For this reason, the resource control server 6 further performs the master-vehicle determining task.

Specifically, the resource control server 6 selects pieces of vehicle information about the vehicles V2 and V3 in the pieces of collected vehicle information from the vehicles V1 to V5; these pieces of vehicle information about the vehicles V2 and V3 are not included in the collected vehicle information sent from each of the master vehicles V1 and V5 that have been determined during this master-vehicle determining task (see steps S70 and S80). In other words, the resource control server 6 selects the vehicles V2 and V3 whose pieces of vehicle information are not included in the collected vehicle information sent from each of the master vehicles V1 and V5. Because the number of pieces of vehicle information included in the collected vehicle information sent from the selected vehicle V2 is identical to that sent from the selected vehicle V3, the determination in step S100 is negative.

Then, the resource control server 6 calculates an available frequency bandwidth for each of the vehicles V2 and V3 based on: a current level of communication quality in centralized communications between each of the vehicles V2 and V3 and the resource control server 6; and an amount of collected vehicle information to be transmitted from each of the vehicles V2 and V3 (see step S110). In this embodiment, it is assumed that the frequency bandwidth for the vehicle V2 is lower than that for the vehicle V3.

Then, the resource control server 6 selects the vehicle V2 that has the frequency band lower than the vehicle V3, and determines the vehicle V2 as a master vehicle (see steps S120 and S130).

At that time, pieces of vehicle information included in at least one of the collected vehicle information sent from the master vehicle V1, the collected vehicle information sent from the master vehicle V2, and the collected vehicle information sent from the master vehicle V5 include information about all the vehicles V1 to V10 (see FIG. 9B and NO in step S70). For this reason, the resource control server 6 creates a master-vehicle list (see step S150), and performs the operations in steps S170 and S180, terminating the master-vehicle determining task.

The wireless-communication system 1 according to this embodiment is comprised of the first type of in-vehicle units 3 and the third type of in-vehicle units 5; each of the communication units 3 and 5 is installed in a corresponding vehicle. Each of the in-vehicle units 3 of the first type is equipped with both a centralized communication function and an inter-vehicle communication function, that is, an ad hoc wireless-communication function. Each of the in-vehicle units 5 of the third type is equipped with a centralized communication function without an ad hoc wireless-communication function. The wireless-communication system 1 is also comprised of the resource control server 6 having a centralized communication function. The resource control server 6 is configured to be communicable with the in-vehicle units 3 and 5 using the centralized communication function, and to manage wireless-communications between the in-vehicle units 3 and the in-vehicle units 5.

The in-vehicle unit 3 of a vehicle is configured to communicate with other in-vehicle units each equipped with an ad hoc wireless-communication function to transmit vehicle information about the corresponding vehicle to each of the other in-vehicle units and receive vehicle information from each of the other in-vehicle units. The vehicle information about a vehicle includes at least a predetermined identifier of the vehicle. The in-vehicle unit 3 of a vehicle is also configured to send, to the resource control server 6, collected vehicle information including the vehicle information about the corresponding vehicle and the vehicle information about each of other vehicles using a centralized communication function.

The in-vehicle unit 5 of a vehicle is configured to send, to the resource control server 6, the vehicle information about the corresponding ego vehicle.

In addition, the resource control server 6 is configured to set, as a master vehicle, at least one vehicle that has transmitted only the vehicle information about the corresponding vehicle to the resource control server 6 (see steps S50 and S60).

Next, the resource control server 6 is configured to set, when at least one vehicle has transmitted, to the resource control server 6, vehicle information about a vehicle that is not included in the collected information sent from the previously determined one or more master vehicles, the at least one vehicle as a master vehicle (see steps S70 to S140).

Thus, the resource control sever 6 collects vehicle information of vehicles each equipped with the in-vehicle unit 3, vehicle information of vehicles each equipped with the in-vehicle unit 5, and vehicle information of vehicles each equipped with the in-vehicle unit 4, which does not have a centralized communication function, but is capable of performing ad hoc wireless communications with the in-vehicle units 3.

Specifically, the resource control server 6 collects vehicle information about:

vehicles capable of performing ad hoc wireless communications with vehicles each equipped with the in-vehicle unit 3; and vehicles equipped with an in-vehicle unit, such as the in-vehicle unit 5, which cannot perform ad hoc wireless communications with the in-vehicle units of other vehicles, so that they cannot establish a group with respect to the other vehicles.

This reduces lack of vehicle information to be collected in collection of vehicle information of vehicles running within a region, such as the centralized communicable region R1, within which the running vehicles are able to communicate with the resource control server 6.

In addition, each vehicle equipped with a centralized communication function obtains, via the resource control server 6, vehicle information of a vehicle located out of the inter-vehicle communicable region of the corresponding vehicle.

Figure 10:
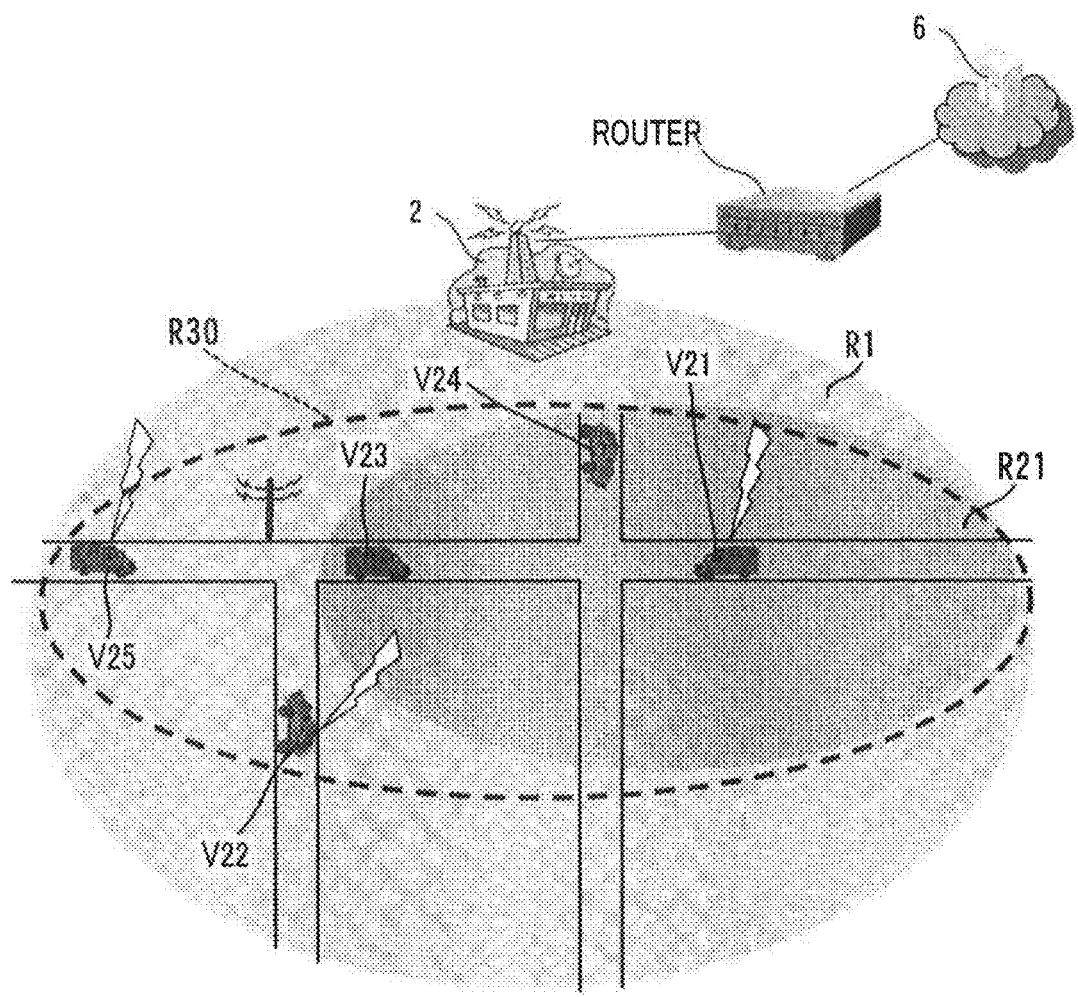
FIG. 10 is a view schematically illustrating an example of a vehicle-information collectable region according to the first embodiment.

For example, as illustrated in FIG. 10, let us consider a case where:

five vehicles V21 to V25 are located within a centralized communicable region R1 of the resource control server 6;

the vehicle V21 is equipped with both a centralized communication function and an ad hoc wireless-communication function;

each of the vehicles V22 and V25 is equipped with a centralized communication function; and each of the vehicles V23 and V24 is equipped with an ad hoc wireless-communication function.

The vehicle V21, having an inter-vehicle communicable region R21, is capable of collecting vehicle information about each of the vehicles V22 and V25, located out of the inter-vehicle communicable region R21 in addition to vehicle information about each of the vehicles V23 and V24, located within the inter-vehicle communicable region R21. This results in an enlarged region R30 of the vehicle V21, which can obtain vehicle information of other vehicles, in comparison to the inter-vehicle communicable region R21 (see FIG. 10). The region R30 will be referred to as a vehicle-information collectable region hereinafter.

If there are plural vehicles having transmitted vehicle information about at least one vehicle, which is out of the collected vehicle information sent from the previously determined one or more master vehicles, the resource control server 6 is configured to determine, as a master vehicle, at least one vehicle in the plural vehicles; the at least one vehicle has transmitted a maximum number of pieces of vehicle information in the plural vehicles (see steps S90 and S140). The at least one vehicle will be referred to as a primary master vehicle.

This configuration results in an elimination of the need to set, as master vehicles, one or more vehicles that have not transmitted vehicle information different from the maximum number of pieces of vehicle information sent from the primary master vehicle. This makes it possible to increase the number of vehicles, which are not required to be set as master vehicles, with increase in the number of pieces of vehicle information transmitted by the workhorse master vehicle. This results in a reduction of the number of vehicles (their in-vehicle units) required to perform wireless communications with the resource control server 6. Thus, the resource control server 6 reduces the number of communication resources, that is, the number of master vehicles, required to perform centralized communications while avoiding lack of vehicle information to be collected.

In addition, if there are plural vehicles having transmitted vehicle information about at least one vehicle, which is out of the collected vehicle information sent from the previously determined one or more master vehicles, the resource control server 6 is configured to determine, as a master vehicle, at least one vehicle in the plural vehicles; the at least one vehicle has the lowest frequency bandwidth required for transmission of corresponding vehicle information in the plural vehicles (see steps S110 and S140).

This configuration is effective in reducing the number of communication resources, that is, the number of master vehicles, required to perform centralized communications while avoiding lack of vehicle information to be collected.

If there are plural vehicles having transmitted vehicle information about at least one vehicle, which is out of the collected vehicle information sent from the previously determined one or more master vehicles, the resource control server 6 is configured to determine, as a master vehicle, at least one vehicle in the plural vehicles; the at least one vehicle has the lowest moving speed, that is, the lowest speed thereof in the plural vehicles (see step S130).

This configuration could avoid the occurrence of a situation in which:

a target vehicle equipped with the in-vehicle unit 3, determined as a master vehicle, is shifted to be out of the centralized communicable region R1 in a short period of time, so that the resource control server 6 may result in non-collection of both the vehicle information of the target vehicle and the vehicle information of other vehicles obtained by ad hoc wireless-communications after lapse of a short period of time since the target vehicle being determined as a master vehicle.

This is because, the lower the moving speed of a vehicle within the centralized communicable region R1, the higher the probability of the target vehicle remaining within the centralized communicable region R1 within a given period of time.

The resource control server 6 according to this embodiment is also configured to calculate, for each of the master vehicles determined in the master-vehicle determining task, an inter-vehicle communicable region (see step S220), and extract at least one non-communicable region within the centralized communicable region R1; the at least one non-communicable region is not contained in a part of the inter-vehicle communicable region of a corresponding one master vehicle, and the part of the inter-vehicle communicable region is within the centralized communicable region R1 (see steps S230 and S240).

Then, the resource control server 6 is configured to set, as a master vehicle, at least one non-master vehicle in a plurality of non-master vehicles, which are not determined as master vehicles in the master-vehicle determining task; the inter-vehicle communicable region of the at least one non-master vehicle overlaps the at least one non-communicable region of at least one of the master vehicles determined in the master-vehicle determining task (see steps S250 to S320).

This configuration prevents lack of vehicle information that should be collected due to variations of inter-vehicle communicable regions of master vehicles caused by movement of them after determination of the master vehicles in the master-vehicle determining task.

If there are plural non-master vehicles with their inter-vehicle communicable regions overlapping the at least one non-communicable region of at least one of the master vehicles determined in the master-vehicle determining task, the resource control server 6 is configured to determine, as a master vehicle, at least one non-master vehicle in the plural non-master vehicles; the at least one non-master vehicle has transmitted a maximum number of pieces of vehicle information in the plural non-master vehicles (see steps S270 and S320).

This configuration enables the resource control server 6 to reduce the number of communication resources, that is, the number of master vehicles, required to perform centralized communications while avoiding lack of vehicle information to be collected.

In addition, if there are plural non-master vehicles with their inter-vehicle communicable regions overlapping the at least one non-communicable region of at least one of the master vehicles determined in the master-vehicle determining task, the resource control server 6 is configured to determine, as a master vehicle, at least one non-master vehicle in the plural non-master vehicles; the at least one non-master vehicle has the lowest frequency bandwidth required for transmission of corresponding vehicle information in the plural non-master vehicles (see steps S290 and S320).

This configuration is effective in reducing the number of communication resources, that is, the number of master vehicles, required to perform centralized communications while avoiding lack of vehicle information to be collected.

If there are plural non-master vehicles with their inter-vehicle communicable regions overlapping the at least one norm-communicable region of at least one of the master vehicles determined in the master-vehicle determining task, the resource control server 6 is configured to determine, as a master vehicle, at least one non-master vehicle in the plural non-master vehicles; the at least one non-master vehicle has the lowest moving speed, that is, the lowest speed thereof in the plural non-master vehicles (see step S310).

This configuration could avoid the occurrence of a situation in which:

a target vehicle equipped with the in-vehicle unit 3, determined as a master vehicle, is shifted to be out of the centralized communicable region R1 in a short period of time, so that the resource control server 6 may result in non-collection of both the vehicle information of the target vehicle and the vehicle information of other vehicles obtained by ad hoc wireless-communications after lapse of a short period of time since the target vehicle being determined as a master vehicle.

The resource control server 6 according to this embodiment is configured to obtain at least one inter-vehicle communicable region of at least one powered-off master vehicle in response to receipt of power-off information from the at least one powered-off master vehicle, and recognize the obtained at least one inter-vehicle communicable region of the at least one powered-off master vehicle as at least one non-communicable region within which inter-vehicle wireless communications cannot be performed (see steps S410 to S430). Then, the resource control server 6 is configured to extract the at least one non-communicable region within the centralized communicable region R1 (see step S440).

Thereafter, the resource control server 6 is configured to set, as a master vehicle, at least one non-master vehicle in a plurality of non-master vehicles, which are not determined as master vehicles in the master-vehicle determining task; the inter-vehicle communicable region of the at least one non-master vehicle overlaps the at least one non-communicable region of the at least one powered-off master vehicle (see steps S450 to S520).

This configuration prevents lack of vehicle information that should be collected due to variations of inter-vehicle communicable regions of master vehicles caused by power-off of them after determination of the master vehicles in the master-vehicle determining task.

The resource control server 6 according to this embodiment is configured to determine all the wide-area wireless vehicles located within the centralized communicable region R1 as master vehicles when the number of the wide-area wireless vehicles located within the centralized communicable region R1 is lower than the master-vehicle determination threshold (see steps S40 and S160).

This configuration could prevent the resource control server 6 from performing the operations in steps S50 to S150 although reduction in the number of master vehicles could be less effective in reducing the number of communication resources.

The resource control server 6 according to this embodiment is configured to determine, as master vehicles, all the vehicles that have transmitted the pieces of collected vehicle information to the resource control server 6 if a predetermined initialization time has elapsed since the time at which the master-determination flag F1 was determined, in other words, at least one master vehicle was determined (see steps S610 and S620). Thereafter, the resource control server 6 is programmed to perform the master-vehicle determining task again at the occurrence of the next cycle of the master-vehicle determining task (see steps S630 and step S10).

This configuration allows the resource control server 6 to receive vehicle information from all the vehicles each equipped with a centralized communication function upon a lapse of the predetermined initialization time even if the inter-vehicle communicable regions of master vehicles vary due to the movement of them, thus resetting, based on the received vehicle information, master vehicles. This prevents lack of vehicle information that should be collected due to variations of inter-vehicle communicable regions of master vehicles caused by the movement of them.

The resource control server 6 according to this embodiment is configured to set, as a master vehicle, at least one non-master vehicle if the at least one non-master vehicle is located close to the boundary of the centralized communicable region R1 (see steps S640 and S650). Even if the at least one master vehicle located close to the boundary of the centralized communicable region R1 enters the centralized communicable region R1 of another resource control server, which is adjacent to the resource control server 6, the at least one master vehicle is capable of sending, to the adjacent resource control server, vehicle information. This prevents the adjacent resource control server from collecting vehicle information of vehicles that enter the corresponding centralized communicable region R1.

In this embodiment, the first type of in-vehicle units 3 corresponds to at least one first type wireless communication unit according to an embodiment of the present disclosure, and the third type of in-vehicle units 5 corresponds to at least one second type wireless communication unit according to an embodiment of the present disclosure. The resource control server 6 corresponds to a communication control apparatus according to an embodiment of the present disclosure, the operation in step S20 corresponds to a receiver according to an embodiment of the present disclosure, and the operations in steps S50 and S60 correspond to a first determiner according to an embodiment of the present disclosure.

The operations in steps S70 to S140, and S170 correspond to a second determiner according to an embodiment of the present disclosure, and a master vehicle corresponds to each of first and second enabling units.

The operations in steps S220 and S230 correspond to a non-overlap region extractor according to an embodiment of the present disclosure, the operations in steps S240 to S320 correspond to a third determiner according to an embodiment of the present disclosure, the operations in step S40 and S170 corresponds to a disabling unit according to an embodiment of the present disclosure, and the operation in step S160 corresponds to a fourth determiner according to an embodiment of the present disclosure. The operations in steps S610 and S620 correspond to a fifth determiner according to an embodiment of the present disclosure, the operations in steps S630 and S10 correspond to a retrying unit according to an embodiment of the present disclosure, and the operations in steps S640 and S650 correspond to a sixth determiner according to an embodiment of the present disclosure.

The operation in step S170 represents an enabling instruction sender and a disabling instruction sender according to an embodiment of the present disclosure, and the operations in steps S710 to S740 correspond to an enabling instruction sender and a disabling instruction sender according to an embodiment of the present disclosure. The operations in steps S800 and S810 correspond to a communication stop information transmitter according to an embodiment of the present disclosure.

Second Embodiment

A wireless-communication system 1A according to a second embodiment of the present disclosure will be described with reference to FIG. 11.

The structure and/or functions of the wireless-communication system 1A according to the second embodiment are different from the wireless-communication system 1 by the following points. So, the different points will be mainly described hereinafter.

Figure 5:
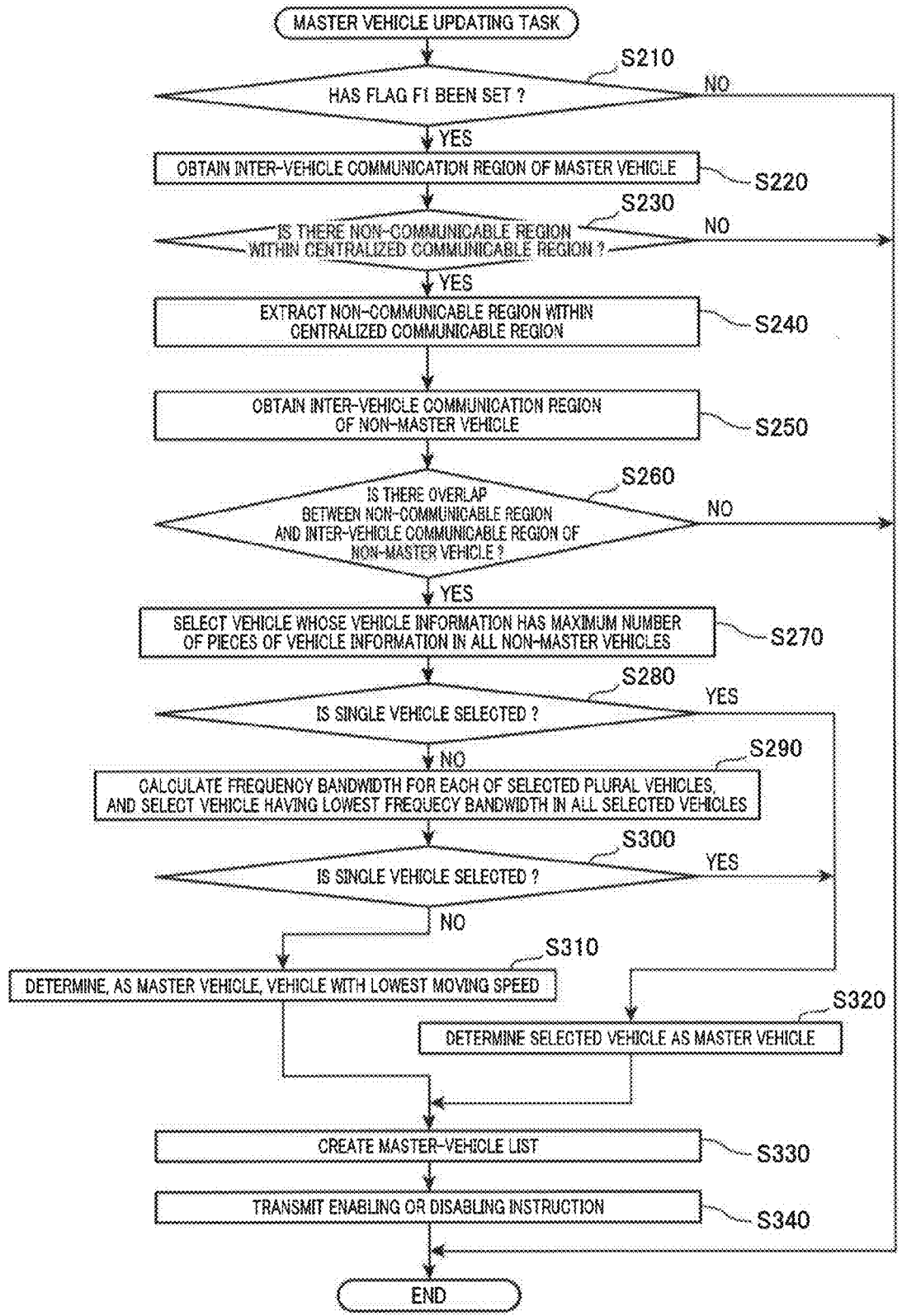
FIG. 5 is a flowchart schematically illustrating a master-vehicle updating task performed by the resource control server.
Figure 11:
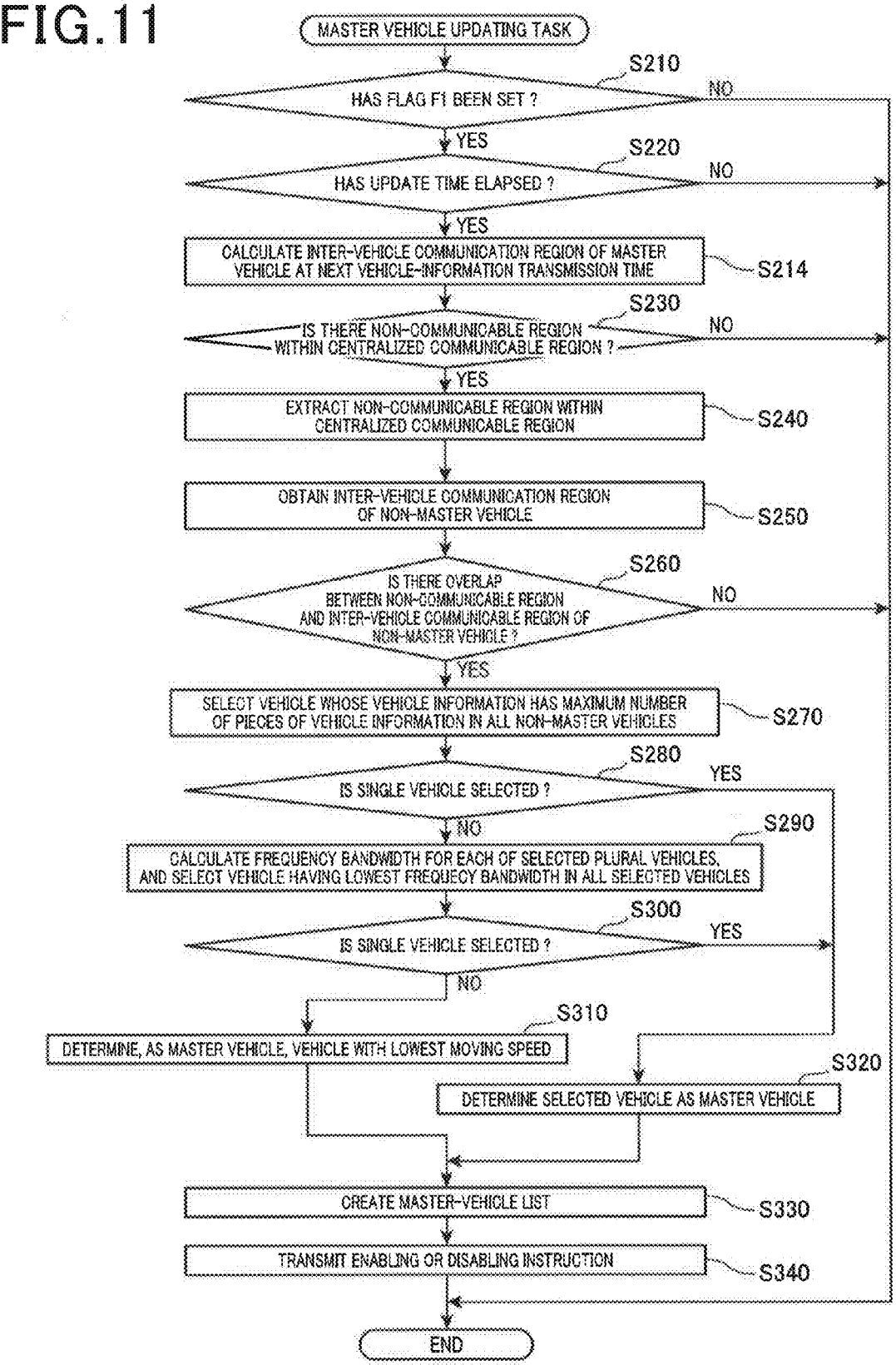
FIG. 11 is a flowchart schematically illustrating a master-vehicle updating task performed by the resource control server according to a second embodiment of the present disclosure.

The wireless-communication system 1A is programmed to perform a master-vehicle updating task illustrated in FIG. 11 in place of that illustrated in FIG. 5.

As illustrated in FIG. 11, in comparison to the master-vehicle updating task illustrated in FIG. 5, the operation in step S220 is omitted in the master-vehicle updating task illustrated in FIG. 11, and the operations in steps S212 and S214 are newly added therein. In the master-vehicle updating task illustrated in FIG. 11 and that illustrated in FIG. 5, like operations (steps) therebetween, to which like reference step numbers are assigned, are omitted or simplified to avoid redundant description.

Specifically, when determining that the master-determination flag F1 has been established (YES in step S210), the CPU 41 determines whether a predetermined update time has elapsed since the time at which the master-determination flag F1 was determined in step S212. When determining that the predetermined update time has not elapsed yet, which includes the case where the master-determination flag F1 has not been set yet (NO in step S212), the CPU 41 terminates the master-vehicle updating task.

Otherwise, when determining that the predetermined update time has elapsed (YES in step S212), the CPU 41 executes step S214. In step S214, the CPU 41 calculates, based on the current position, the speed, and the inter-vehicle communicable range of at least one master vehicle on the master-file list currently stored therein or the RAM 43, an inter-vehicle communicable region of the at least one master vehicle at the next vehicle-information transmission time. As described above, the at least one master vehicle is designed to transmit, to the resource server 6, the collected vehicle information every preset period of, for example, 10 milliseconds. For this reason, the next vehicle-information transmission time represents the timing at which the period has elapsed since the previous receipt of the collected vehicle information from the at least one master vehicle.

After calculation of the inter-vehicle communicable region of the at least one master vehicle at the next vehicle-information transmission time, the CPU 41 executes step S230, and performs the operations in steps S230 to S340 set forth above.

That is, the resource control server 6 of the wireless-communication system 1 is programmed to determine whether there is at least one non-communicable region within the centralized communicable region R1 at the next vehicle-information transmission time in step S230. The at least one non-communicable region is not contained in a part of the inter-vehicle communicable region of the at least one master vehicle at the next vehicle-information transmission time the part of the inter-vehicle communicable region is within the centralized communicable region R1.

When determining that there is at least one non-communicable region within the centralized communicable region R1 at the next vehicle-information transmission time (YES in step S230), the CPU 41 extracts the at least one non-communicable region within the centralized communicable region R1 in step S240.

That is, the resource control server 6 according to this embodiment is configured to estimate an inter-vehicle communicable region of at least one master vehicle at the next vehicle-information transmission time, and recognize the obtained at least one inter-vehicle communicable region of the at least one master vehicle as at least one non-communicable region within which inter-vehicle wireless communications cannot be performed (see steps S212, S214, and S230). Then, the resource control server 6 is configured to extract the at least one non-communicable region within the centralized communicable region R1 (see step S240).

Thereafter, the resource control server 6 is configured to set, as a master vehicle, at least one non-master vehicle in a plurality of non-master vehicles, which are not determined as master vehicles in the master-vehicle determining task; the inter-vehicle communicable region of the at least one non-master vehicle overlaps the at least one non-communicable region of the at least one master vehicle (see steps S450 to S520).

This configuration prevents lack of vehicle information that should be collected due to variations of inter-vehicle communicable regions of master vehicles caused by movement of them after determination of the master vehicles in the master-vehicle determining task.

The present disclosure is not limited to the descriptions of the above embodiments, and it can be modified as follows.

Figure 12:
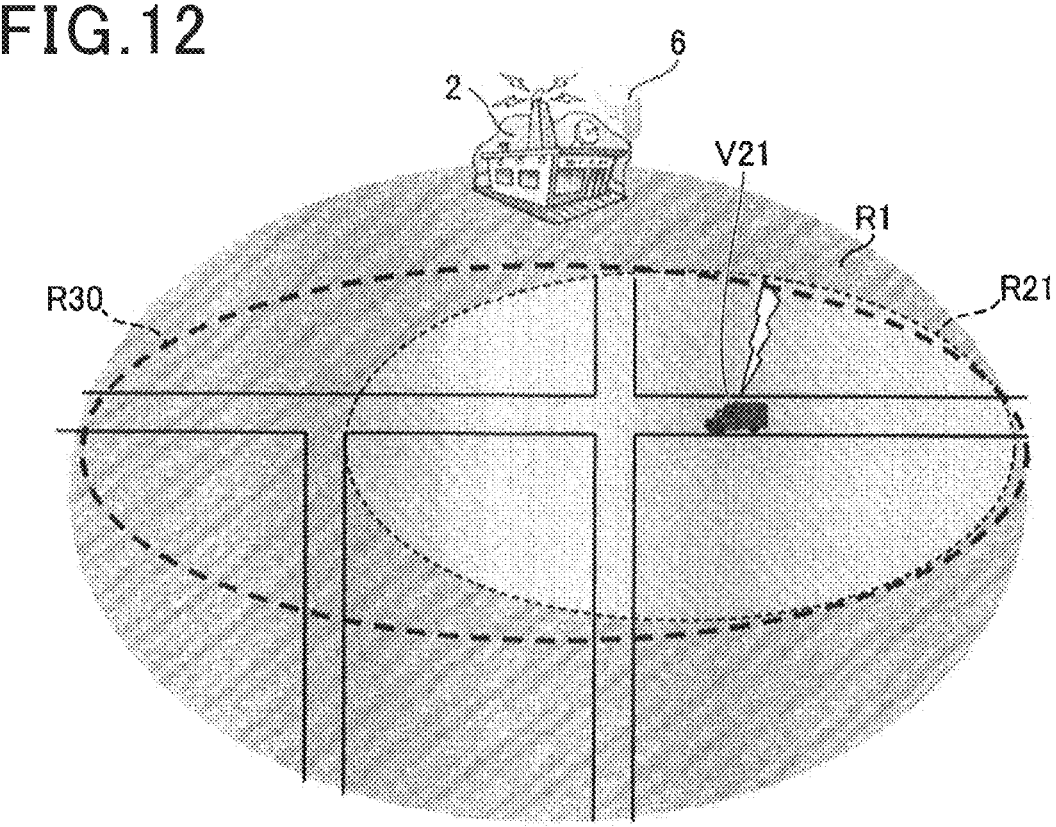
FIG. 12 is a view schematically illustrating an example of the arrangement of the resource control server according to one modification of each of the first and second embodiments.

As illustrated in FIG. 10, each of the wireless-communication systems 1 and 1A is configured such that the base station 2 and the resource control server 6 are located to be separated from each other, but the present disclosure is not limited thereto. Specifically, the resource control server 6 can be located in the base station 2 (see FIG. 12).

Figure 13:
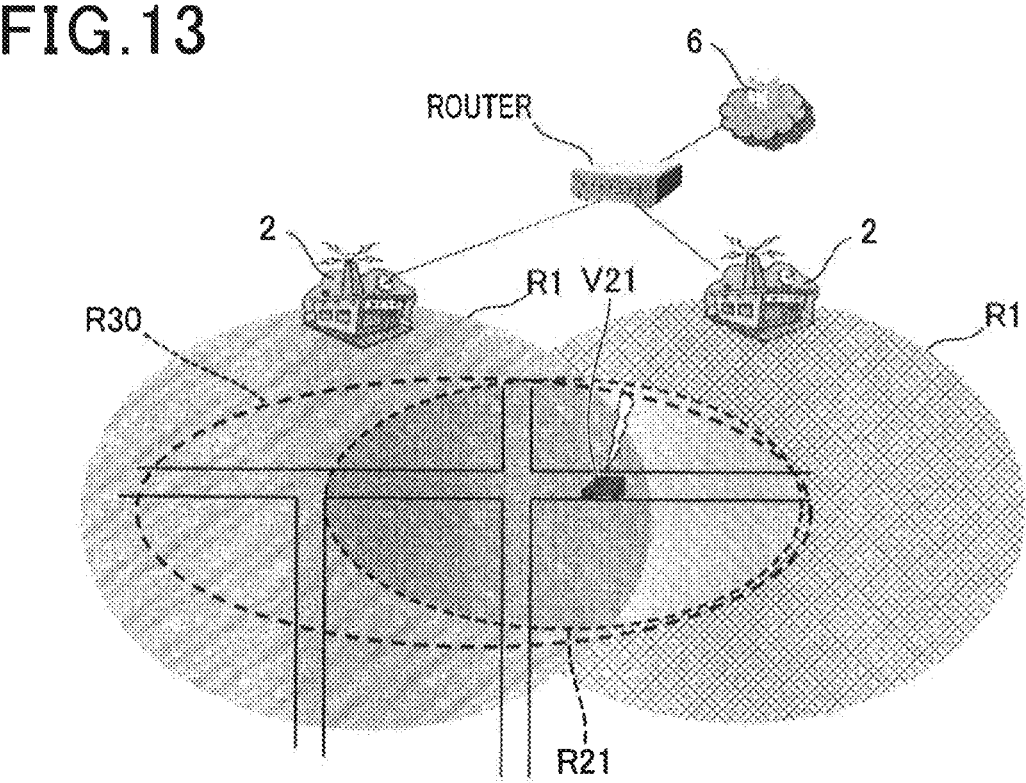
FIG. 13 is a view schematically illustrating an example of a vehicle-information collectable region according to another modification of each of the first and second embodiments.

In each of the first and second embodiments, a vehicle-information collectable region R30 of a vehicle equipped with a centralized communication function is included in the centralized communication region R1, but the present disclosure is not limited thereto. Specifically, referring to FIG. 13, a vehicle-information collectable region R30 of a vehicle V21 equipped with a centralized communication function can expand to be included in the combination of respective centralized communication regions R1 of a plurality of base stations 2 communicably connected to the resource control server 6.

While illustrative embodiments of the present disclosure have been described herein, the present disclosure is not limited to the embodiment described herein, but includes any and all embodiments having modifications, omissions, combinations (e.g., of aspects across various embodiments), adaptations and alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A communication control apparatus used in a wireless communication system in which a plurality of first in-vehicle wireless communication units are installed in a plurality of vehicles, respectively, and a second in-vehicle wireless communication unit is installed in a vehicle, each of the pluralit of first in-vehicle wireless communication units having a centralized wireless communication function and an ad hoc wireless communication function, the second in-vehicle wireless communication unit having the centralized wireless communication function without the ad hoc wireless communication function, the communication control apparatus being wirelessly communicable with each of the first in-vehicle wireless communication units, and the second in-vehicle wireless communication unit according to the centralized wireless communication functions and controlling wireless communications among the communication control apparatus, each of the first in-vehicle wireless communication units, and the second in-vehicle wireless communication unit, each of the first in-vehicle wireless communication units:
transmitting vehicle information of an own vehicle and vehicle information including identification information from the first-in-vehicle wireless communication unit installed in another vehicle, received from another vehicle at the communication control apparatus according to the centralized wireless communication function, when the first in-vehicle wireless communication unit receives, by a corresponding ad hoc wireless function, at least the vehicle information including the identification information from another vehicle; and transmitting only the vehicle information of the own vehicle to the communication control apparatus according to the centralized wireless communication function, when the first in-vehicle communication unit does not receive any vehicle information transmitted from another vehicle, and the second in-vehicle wireless communication unit transmitting the vehicle information of the own vehicle to the communication control apparatus according to the centralized wireless communication function, the communication control apparatus comprising:

a first communication authorization setting means for setting a first one of the first in-vehicle wireless communication units and the second in-vehicle wireless communication unit as two of a plurality of communication enabling units that enable wireless communications with the communication control apparatus, the first of the first in-vehicle wireless communication units and the second in-vehicle wireless communication unit having transmitted only the vehicle information of their own vehicle to the communication control apparatus; and a second communication authorization setting means for setting, as another one of the plurality of communication enabling units, one of the remaining first in-vehicle wireless communication units that has not been set as one of the plurality of communication enabling units, the one of the remaining first in-vehicle wireless communication units having transmitted the vehicle information of another vehicle different from the vehicle information transmitted from the communication enabling unit.

2. The communication control apparatus according to claim 1, wherein, if there are a plurality of the first in-vehicle wireless communication units that have transmitted the vehicle information of another vehicle different from the vehicle information transmitted from the communication enabling unit, the second communication authorization setting means sets, as the communication enabling unit, one of the plurality of first in-vehicle wireless communication units, the one of the plurality of first in-vehicle wireless communication units having transmitted the vehicle information of a maximum number of other vehicles in the plurality of first in-vehicle wireless communication units.

3. The communication control apparatus according to claim 1, wherein, if there are a plurality of first in-vehicle wireless communication units, each of which has transmitted the vehicle information of another vehicle different from the vehicle information transmitted from the communication enabling unit, the second communication authorization setting means sets, as the communication enabling unit, one of the plurality of first in-vehicle wireless communication units, the one of the plurality of first in-vehicle wireless communication units having a lowest frequency bandwidth required to transmit the corresponding vehicle information in the plurality of first in-vehicle wireless communication units.

4. The communication control apparatus according to claim 1, wherein, if there are a plurality of first in-vehicle wireless communication units, each of which has transmitted the vehicle information of another vehicle different from the vehicle information transmitted from the communication enabling unit, the second communication authorization setting means sets, as the communication enabling unit, one of the plurality of first in-vehicle wireless communication units, the one of the plurality of first in-vehicle wireless communication units having a lowest moving speed of the corresponding vehicle in the plurality of first in-vehicle wireless communication units.

5. The communication control apparatus according to claim 1, further comprising:

a non-overlap region extracting means for:

estimating, for each of the communication enabling units set by the first and second communication authorization setting means, an ad hoc wireless communication region within which ad hoc wireless communications are permitted based on the ad hoc wireless communication function; and extracting a region on which the ad hoc wireless communication region and a centralized wireless communication region within which communications with the communication control apparatus are permitted based on the centralized wireless communication function are non-overlapped with each other; and a third communication authorization setting means for setting, as the communication enabling unit, one of the first in-vehicle wireless communication units that have not been set as the communication enabling unit, the ad hoc wireless communication region of the one of the first in-vehicle wireless communication units being overlapped with a non-ad-hoc wireless communication region that is the region extracted by the non-overlap region extracting means.

6. The communication control apparatus according to claim 5, wherein, if there are a plurality of first in-vehicle wireless communication units, each of which is overlapped with the non-ad-hoc wireless communication region, the third communication authorization setting means sets, as the communication enabling unit, one of the plurality of first in-vehicle wireless communication units, the one of the plurality of first in-vehicle wireless communication units having transmitted the vehicle information of a maximum number of other vehicles in the plurality of first in-vehicle wireless communication units.

7. The communication control apparatus according to claim 5, wherein, if there are a plurality of first in-vehicle wireless communication units, each of which is overlapped with the non-ad-hoc wireless communication region, the third communication authorization setting means sets, as the communication enabling unit, one of the plurality of first in-vehicle wireless communication units, the one of the plurality of first in-vehicle wireless communication units having a lowest frequency bandwidth required to transmit the corresponding vehicle information in the plurality of first in-vehicle wireless communication units.

8. The communication control apparatus according to claim 5, wherein, if there are a plurality of first in-vehicle wireless communication units, each of which is overlapped with the non-ad-hoc wireless communication region, the third communication authorization setting means sets, as the communication enabling unit, one of the plurality of first in-vehicle wireless communication units, the one of the plurality of first in-vehicle wireless communication units having a lowest moving speed of the corresponding own vehicle in the plurality of first in-vehicle wireless communication units.

9. The communication control apparatus according to claim 5, wherein the non-overlap region extracting means extracts the non-ad-hoc wireless communication region at timing when the communication control apparatus transmits the vehicle information next.

10. The communication control apparatus according to claim 5, wherein the non-overlap region extracting means extracts the non-ad-hoc wireless communication region when a preset time has elapsed since the communication enabling unit was set by the first communication authorization setting means.

11. The communication control apparatus according to claim 5, wherein, when receiving, from one of the communication enabling units, communication stop information that stops communications based on the centralized wireless communication function, the non-overlap region extracting means eliminates the one of the communication enabling units, thus extracting the non-ad-hoc wireless communication region.

12. The communication control apparatus according to claim 1, further comprising:
   a disabling means for disabling an operation of the first communication authorization setting means upon a number of the wireless communication units that have transmitted the vehicle information to the communication control apparatus is lower than a preset threshold; and
   a fourth communication authorization setting means for setting, as the communication enabling unit, all the number of the wireless communication units that have transmitted the vehicle information to the communication control apparatus upon the disabling means disabling the operation of the first communication authorization setting means.

13. The communication control apparatus according to claim 1, further comprising:
   a fifth communication authorization setting means for setting, as the communication enabling unit, all the wireless communication units that have transmitted the vehicle information to the communication control apparatus upon a preset time having elapsed since the communication enabling unit was set by the first communication authorization setting means; and
   a resetting means for activating the first communication authorization setting means and the second authorization setting means after set of the communication enabling units by the fifth communication authorization setting means.

14. The communication control apparatus according to claim 1, further comprising:
   a sixth communication authorization setting means for setting, as the communication enabling unit, one of the remaining first or second in-vehicle wireless communication units that have not been set as the communication enabling unit, the one of the remaining first or second in-vehicle wireless communication units being located close to a boundary of a centralized wireless communication region within which communications with the communication control apparatus are permitted based on the centralized wireless communication function.

15. An in-vehicle wireless communication unit used as one of the first in-vehicle wireless communication unit and the second in-vehicle wireless communication unit in any one of the wireless communication systems according to claim 1, the in-vehicle wireless communication unit comprising:
   a transmission setting means for:
      enabling transmission of the vehicle information to the communication control apparatus when receiving, from the communication control apparatus, enabling information indicative of the in-vehicle wireless communication unit being set as the communication enabling unit; and
      disabling transmission of the vehicle information to the communication control apparatus when receiving, from the communication control apparatus, disabling information indicative of the in-vehicle wireless communication unit being unset as the communication enabling unit.

16. An in-vehicle wireless communication unit used as the second in-vehicle wireless communication unit in the wireless communication system according to claim 11, the in-vehicle wireless communication unit comprising:
   a communication-stop information sending means for sending, to the communication control apparatus, the communication stop information upon stop of communications based on the centralized wireless communication function.

17. The communication control apparatus according to claim 2, further comprising:
   a non-overlap region extracting means for:
      estimating, for each of the communication enabling units set by the first and second communication authorization setting means, an ad hoc wireless communication region within which ad hoc wireless communications are permitted based on the ad hoc wireless communication function; and
      extracting a region on which the ad hoc wireless communication region and a centralized wireless communication region within which communications with the communication control apparatus are permitted based on the centralized wireless communication function are non-overlapped with each other; and
   a third communication authorization setting means for setting, as the communication enabling unit, one of the first in-vehicle wireless communication units that have not been set as the communication enabling unit, the ad hoc wireless communication region of the one of the first in-vehicle wireless communication units being overlapped with a non-ad-hoc wireless communication region that is the region extracted by the non-overlap region extracting means.

18. The communication control apparatus according to claim 6, wherein the non-overlap region extracting means extracts the non-ad-hoc wireless communication region at timing when the communication control apparatus transmits the vehicle information next.

19. The communication control apparatus according to claim 6, wherein the non-overlap region extracting means extracts the non-ad-hoc wireless communication region when a preset time has elapsed since the communication enabling unit was set by the first communication authorization setting means.

20. The communication control apparatus according to claim 6, wherein, when receiving, from one of the communication enabling units, communication stop information that stops communications based on the centralized wireless communication function, the non-overlap region extracting means eliminates the one of the communication enabling units, thus extracting the non-ad-hoc wireless communication region.

* * * * *